(12) United States Patent
Yasunaka

(10) Patent No.: US 10,606,972 B2
(45) Date of Patent: Mar. 31, 2020

(54) METHOD, DESIGN PROGRAM, AND DESIGN APPARATUS OF A HIGH LEVEL SYNTHESIS PROCESS OF A CIRCUIT

(71) Applicant: SOCIONEXT INC., Yokohama-shi, Kanagawa (JP)

(72) Inventor: Atsushi Yasunaka, Yokohama (JP)

(73) Assignee: SOCIONEXT INC., Yokohama (JP)

( * ) Notice: Subject to any disclaimer, the term of this patent is extended or adjusted under 35 U.S.C. 154(b) by 45 days.

(21) Appl. No.: 15/968,327

(22) Filed: May 1, 2018

(65) Prior Publication Data

US 2018/0246997 A1 Aug. 30, 2018

Related U.S. Application Data

(63) Continuation of application No. PCT/JP2016/063340, filed on Apr. 28, 2016.

(30) Foreign Application Priority Data

Dec. 16, 2015 (JP) .................................. 2015-244798

(51) Int. Cl.
*G06F 17/50* (2006.01)
(52) U.S. Cl.
CPC ........ *G06F 17/505* (2013.01); *G06F 2217/06* (2013.01); *G06F 2217/84* (2013.01)
(58) Field of Classification Search
CPC ........................... G06F 17/505; G06F 2217/06
(Continued)

(56) References Cited

U.S. PATENT DOCUMENTS 9,235,672 B2 * 1/2016 Yasunaka et al. ..... G06F 17/505
9,250,900 B1 * 2/2016 Kim et al. .............. G06F 15/76
(Continued)

FOREIGN PATENT DOCUMENTS

| JP | H10-063713 A | 3/1988 |
| JP | 2000-194739 A | 7/2000 |
| JP | 2014-006650 A | 1/2014 |

OTHER PUBLICATIONS

International Search Report for related foreign application No. PCT/JP2016/063340 dated Jul. 12, 2016.

*Primary Examiner* — Sun J Lin
(74) *Attorney, Agent, or Firm* — Arent Fox LLP

(57) ABSTRACT

A design method including a high level synthesis process that has (1) generating a hardware description of a circuit and high level synthesis report information from a source code based on a high level synthesis constraint, the hardware description describing a circuit including a plurality of stages and inter-stage registers; (2) determining a bypass stage selection pattern based on bypass constraint information including a constraint condition related to a bypass of the inter-stage register and the high level synthesis report information, the bypass stage selection pattern including a plurality of patterns each pattern having a combination of stages of inter-stage registers for which bypass setting is performed among stages of a bypass setting-capable inter-stage registers; and (3) generating bypass report information based on the bypass stage selection pattern, the bypass report information including combination information of the inter-stage registers for which the bypass is performed setting corresponding to a predetermined priority condition.

13 Claims, 29 Drawing Sheets

(58) Field of Classification Search
USPC .................................................. 716/101, 102
See application file for complete search history.

(56) References Cited

U.S. PATENT DOCUMENTS

2013/0346929 A1   12/2013  Toi et al.
2015/0106774 A1*  4/2015  Yasunaka et al. .... G06F 17/505
                                                          716/102

* cited by examiner

FIG. 10
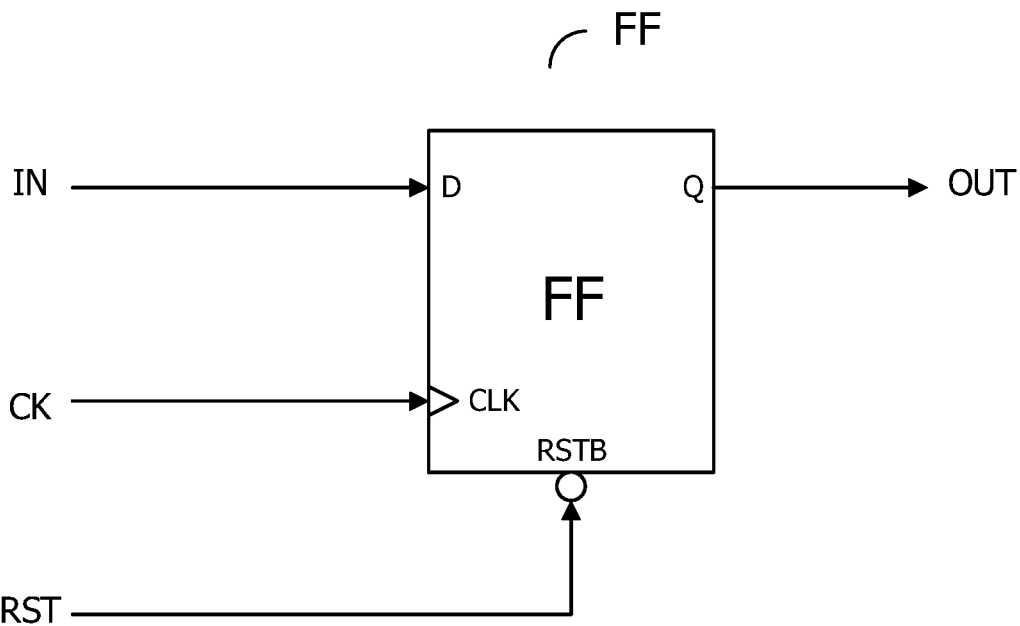
S# = 1 : Bypass
S# = 0 : Not bypass
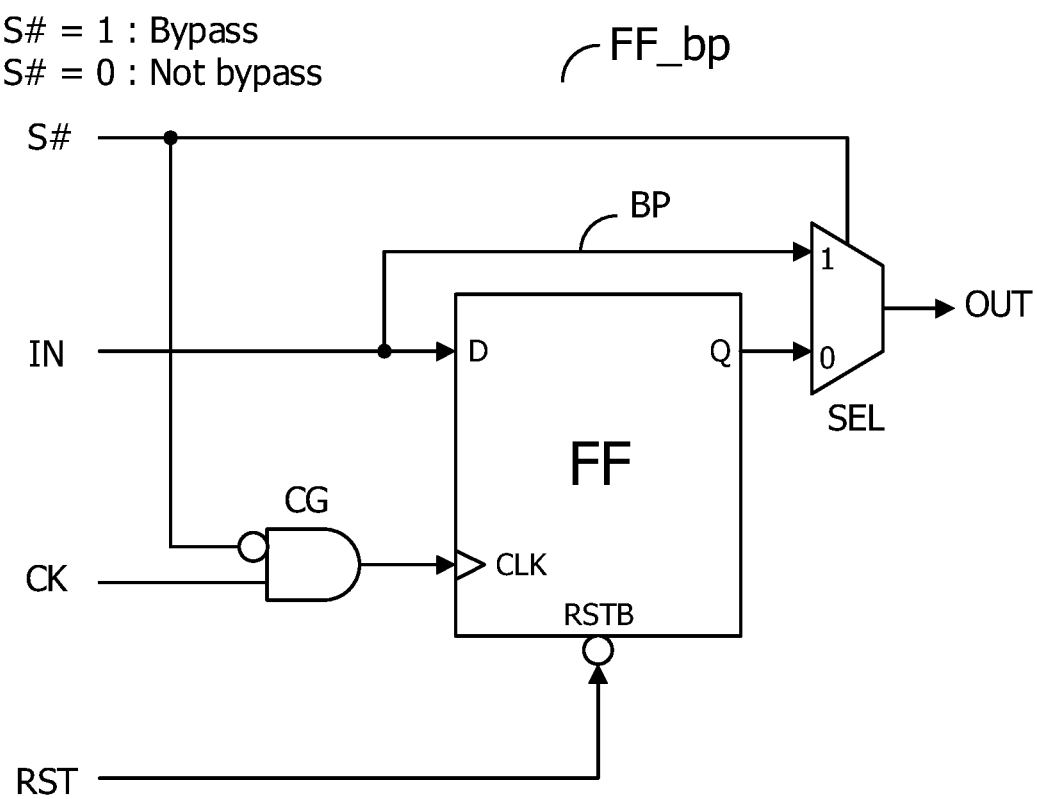

FIG. 12

| ITEM No. | SET ITEM | CONTENT | SETTING EXAMPLE |
|---|---|---|---|
| 1 | NUMBER (OR RANGE OF NUMBER) OF BYPASS STAGES (STAGES OF BYPASS SETTING-CAPABLE REGISTERS) | 1-2 | 1, 2, 4-5 |
| 2 | BYPASS INHIBITION OF INPUT FIRST STAGE | true | true or false |
| 3 | BYPASS INHIBITION OF OUTPUT FINAL STAGE | false | true or false |
| 4 | SPECIFIC STAGE IN WHICH BYPASS IS INHIBITED | Stage_NO. | Stage_5N |
| 5 | MINIMUM NUMBER OF CONSECUTIVE STAGES IN WHICH BYPASS IS INHIBITED | 0 | 2, 3, etc. |

FIG. 13
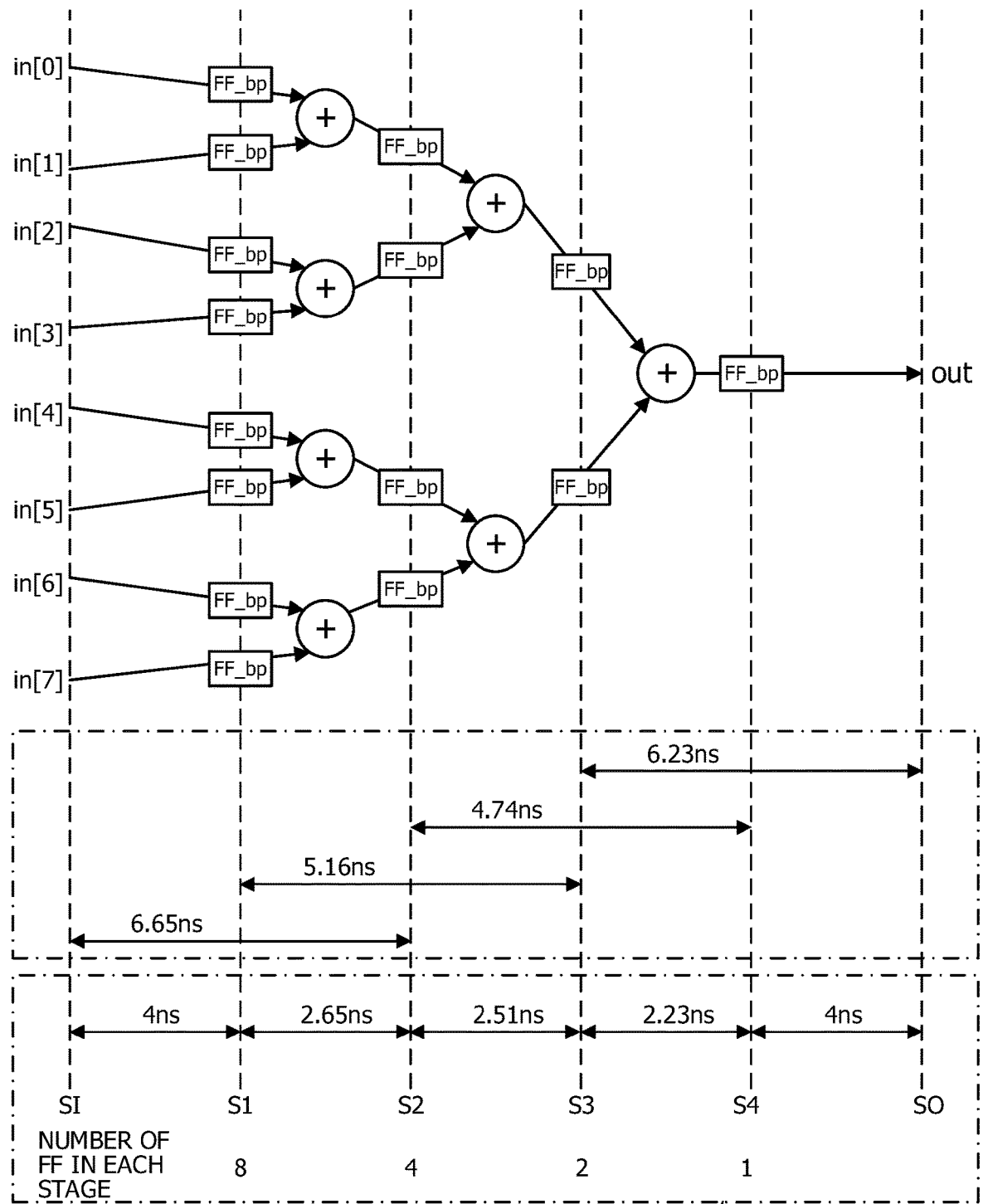
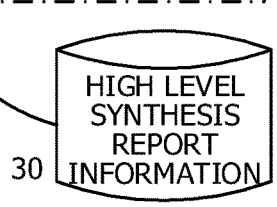

FIG. 15

DELAY INFORMATION IN THE CASE WHERE THE NUMBER OF BYPASS STAGES IS ONE  R1_1

| MODE SETTING | BYPASS STAGE SELECTION PATTERN | | | | PATH DELAY | | | | | MAXIMUM PATH DELAY | MODE SETTING RANKINGS |
|---|---|---|---|---|---|---|---|---|---|---|---|
| | S1 | S2 | S3 | S4 | SI→S1 | S1→S2 | S2→S3 | S3→S4 | S4→SO | | |
| M1S1 | bypass | | | | 6.65ns | 2.51ns | 2.23ns | 4ns | | 6.65ns | TM1L3 |
| M1S2 | | bypass | | | 4ns | 5.16ns | 2.23ns | 4ns | | 5.16ns | TM1L2 |
| M1S3 | | | bypass | | 4ns | 2.65ns | 4.74ns | 4ns | | 4.74ns | TM1L1 |
| M1S4 | | | | bypass | 4ns | 2.65ns | 2.51ns | 6.23ns | | 6.23ns | TM1L4 |

DELAY INFORMATION IN THE CASE WHERE THE NUMBER OF BYPASS STAGES IS TWO  R1_2

| MODE SETTING | BYPASS STAGE SELECTION PATTERN | | | | PATH DELAY | | | | | MAXIMUM PATH DELAY | MODE SETTING RANKINGS |
|---|---|---|---|---|---|---|---|---|---|---|---|
| | S1 | S2 | S3 | S4 | SI→S1 | S1→S2 | S2→S3 | S3→S4 | S4→SO | | |
| M2S13 | bypass | | bypass | | 6.65ns | 4.74ns | | 4ns | | 6.65ns | TM2L2 |
| M2S24 | | bypass | | bypass | 4ns | 5.16ns | | 6.23ns | | 6.23ns | TM2L1 |
| M2S12 | bypass | bypass | | | 9.16ns | | 2.23ns | 4ns | | 9.16ns | TM2L6 |
| M2S34 | | | bypass | bypass | 4ns | 2.65ns | 8.74ns | | | 8.74ns | TM2L5 |
| M2S14 | bypass | | | bypass | 6.65ns | 2.51ns | 6.23ns | | | 6.65ns | TM2L3 |
| M2S23 | | bypass | bypass | | 4ns | 7.39ns | | 4ns | | 7.39ns | TM2L4 |

•
•
•

FF NUMBER INFORMATION IN THE CASE WHERE THE NUMBER OF BYPASS STAGES IS ONE  R2_1

| MODE SETTING | BYPASS STAGE SELECTION PATTERN | | | | NUMBER OF FF IN EACH STAGE | | | | FF NUMBER OF CIRCUIT | | MODE SETTING RANKINGS |
|---|---|---|---|---|---|---|---|---|---|---|---|
| | S1 | S2 | S3 | S4 | S1 | S2 | S3 | S4 | TOTAL | NUMBER OF DELETION | |
| M1S1 | bypass | | | | 0 | 4 | 2 | 1 | 7 | 8 | PM1L1 |
| M1S2 | | bypass | | | 8 | 0 | 2 | 1 | 11 | 4 | PM1L2 |
| M1S3 | | | bypass | | 8 | 4 | 0 | 1 | 13 | 2 | PM1L3 |
| M1S4 | | | | bypass | 8 | 4 | 2 | 0 | 14 | 1 | PM1L4 |

FF NUMBER INFORMATION IN THE CASE WHERE THE NUMBER OF BYPASS STAGES IS TWO  R2_2

| MODE SETTING | BYPASS STAGE SELECTION PATTERN | | | | NUMBER OF FF IN EACH STAGE | | | | FF NUMBER OF CIRCUIT | | MODE SETTING RANKINGS |
|---|---|---|---|---|---|---|---|---|---|---|---|
| | S1 | S2 | S3 | S4 | S1 | S2 | S3 | S4 | TOTAL | NUMBER OF DELETION | |
| M2S13 | bypass | | bypass | | 0 | 4 | 0 | 1 | 5 | 10 | PM2L2 |
| M2S24 | | bypass | | bypass | 8 | 0 | 2 | 0 | 10 | 5 | PM2L5 |
| M2S12 | bypass | bypass | | | 0 | 0 | 2 | 1 | 3 | 12 | PM2L1 |
| M2S34 | | | bypass | bypass | 8 | 4 | 0 | 0 | 12 | 3 | PM2L6 |
| M2S14 | bypass | | | bypass | 0 | 4 | 2 | 0 | 6 | 9 | PM2L3 |
| M2S23 | | bypass | bypass | | 8 | 0 | 0 | 1 | 1 | 6 | PM2L4 |

BYPASS REPORT / SUMMARY: MODE SETTING SR1

| NUMBER OF BYPASS STAGES | TIMING PRIORITY | | POWER CONSUMPTION PRIORITY | |
|---|---|---|---|---|
| 0 | TM0 | M0 | PM0 | M0 |
| 1 | TM1L1 | M1S3 | PM1L1 | M1S1 |
| 2 | TM2L1 | M2S24 | PM2L1 | M2S12 |
| ... | ... | ... | ... | ... |

BYPASS INHIBITION OF INPUT FIRST STAGE: False

BYPASS REPORT / SUMMARY: MODE SETTING SR2

| NUMBER OF BYPASS STAGES | TIMING PRIORITY | | POWER CONSUMPTION PRIORITY | |
|---|---|---|---|---|
| 0 | TM0 | M0 | PM0 | M0 |
| 1 | TM1L1 | M1S3 | PM1L2 | M1S2 |
| 2 | TM2L1 | M2S24 | PM2L4 | M2S23 |
| ... | ... | ... | ... | ... |

BYPASS INHIBITION OF INPUT FIRST STAGE: True

BYPASS REPORT / SUMMARY: TIMING PRIORITY SR3

| MODE SETTING RANKING | MODE SETTING | BYPASS STAGE | MAXIMUM DELAY | NUMBER OF FF DELETION |
|---|---|---|---|---|
| TM0 | M0 | - | 4.0ns | 0 |
| TM1L1 | M1S3 | S3 | 4.74ns | 2 |
| TM2L1 | M2S24 | S2,S4 | 6.23ns | 5 |
| ... | ... | ... | ... | ... |

BYPASS REPORT / SUMMARY: POWER CONSUMPTION PRIORITY SR4

| MODE SETTING RANKING | MODE SETTING | BYPASS STAGE | MAXIMUM DELAY | NUMBER OF FF DELETION |
|---|---|---|---|---|
| PM0 | M0 | - | 4.0ns | 0 |
| PM1L2 | M1S2 | S2 | 5.16ns | 4 |
| PM2L4 | M2S23 | S2,S3 | 7.39ns | 6 |
| ... | ... | ... | ... | ... |

FIG. 18

BYPASS STAGE INFORMATION 33

| MODE SETTING | BYPASS STAGE SELECTION PATTERN | | | |
|---|---|---|---|---|
| | S1 | S2 | S3 | S4 |
| M0 | | | | |
| M1S1 | bypass | | | |
| M1S2 | | bypass | | |
| M1S3 | | | bypass | |
| M1S4 | | | | bypass |
| M2S13 | bypass | | bypass | |
| M2S24 | | bypass | | bypass |
| M2S12 | bypass | bypass | | |
| M2S34 | | | bypass | bypass |
| M2S14 | bypass | | | bypass |
| M2S23 | | bypass | bypass | |

DECODE TABLE 33D

| MODE SETTING | | BYPASS STAGE SELECTION PATTERN | | | |
|---|---|---|---|---|---|
| NAME | MODE | S1 | S2 | S3 | S4 |
| M0 | VALUE OTHER THAN THOSE INDICATED BELOW | 0 | 0 | 0 | 0 |
| M1S1 | 4'b0001 | 1 | 0 | 0 | 0 |
| M1S2 | 4'b0010 | 0 | 1 | 0 | 0 |
| M1S3 | 4'b0011 | 0 | 0 | 1 | 0 |
| M1S4 | 4'b0100 | 0 | 0 | 0 | 1 |
| M2S13 | 4'b1001 | 1 | 0 | 1 | 0 |
| M2S24 | 4'b1010 | 0 | 1 | 0 | 1 |
| M2S12 | 4'b1011 | 1 | 1 | 0 | 0 |
| M2S34 | 4'b1100 | 0 | 0 | 1 | 1 |
| M2S14 | 4'b1101 | 1 | 0 | 0 | 1 |
| M2S23 | 4'b1110 | 0 | 1 | 1 | 0 |

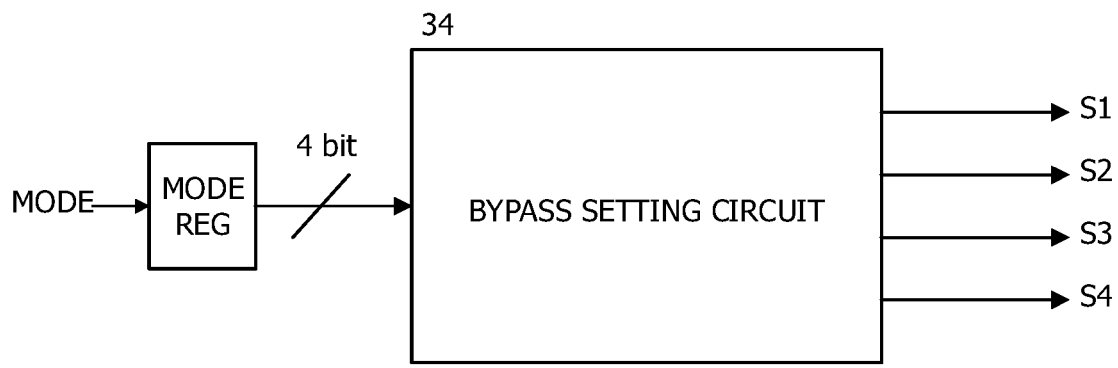

FIG. 25

DELAY INFORMATION IN THE CASE WHERE THE NUMBER OF BYPASS STAGES IS ONE  R1_1

| MODE SETTING | BYPASS STAGE SELECTION PATTERN | | | | PATH DELAY | | | | | MAXIMUM PATH DELAY | MODE SETTING RANKINGS |
|---|---|---|---|---|---|---|---|---|---|---|---|
| | S1 | S2 | S3 | S4 | SI→S1 | S1→S2 | S2→S3 | S3→S4 | S4→SO | | |
| M1S1 | bypass | | | | 6.65ns | 2.51ns | 2.23ns | | 4ns | 6.65ns | TM1L3 |
| M1S2 | | bypass | | | 4ns | 5.16ns | 2.23ns | | 4ns | 5.16ns | TM1L2 |
| M1S3 | | | bypass | | 4ns | 2.65ns | 4.74ns | | 4ns | 4.74ns | TM1L1 |
| M1S4 | | | | bypass | 4ns | 2.65ns | 2.51ns | | 6.23ns | 6.23ns | TM1L4 |

DELAY INFORMATION IN THE CASE WHERE THE NUMBER OF BYPASS STAGES IS TWO  R1_2

| MODE SETTING | BYPASS STAGE SELECTION PATTERN | | | | PATH DELAY | | | | | MAXIMUM PATH DELAY | MODE SETTING RANKINGS |
|---|---|---|---|---|---|---|---|---|---|---|---|
| | S1 | S2 | S3 | S4 | SI→S1 | S1→S2 | S2→S3 | S3→S4 | S4→SO | | |
| M2S13 | bypass | | bypass | | 6.65ns | | 4.74ns | | 4ns | 6.65ns | TM2L2 |
| M2S24 | | bypass | | bypass | 4ns | 5.16ns | | 6.23ns | | 6.23ns | TM2L1 |
| M2S12 | bypass | bypass | | | | 9.16ns | | 2.23ns | 4ns | 9.16ns | TM2L6 |
| M2S34 | | | bypass | bypass | 4ns | 2.65ns | | 8.74ns | | 8.74ns | TM2L5 |
| M2S14 | bypass | | | bypass | 6.65ns | 2.51ns | | 6.23ns | | 6.65ns | TM2L3 |
| M2S23 | | bypass | bypass | | 4ns | | 7.39ns | | 4ns | 7.39ns | TM2L4 |

• • •

FF NUMBER INFORMATION IN THE CASE WHERE THE NUMBER OF BYPASS STAGES IS ONE  R2_1

| MODE SETTING | BYPASS STAGE SELECTION PATTERN | | | | NUMBER OF FF IN EACH STAGE | | | | FF NUMBER OF CIRCUIT | | MODE SETTING RANKINGS |
|---|---|---|---|---|---|---|---|---|---|---|---|
| | S1 | S2 | S3 | S4 | S1 | S2 | S3 | S4 | TOTAL | NUMBER OF DELETION | |
| M1S1 | bypass | | | | 0 | 4 | 2 | 1 | 7 | 8 | PM1L1 |
| M1S2 | | bypass | | | 8 | 0 | 2 | 1 | 11 | 4 | PM1L2 |
| M1S3 | | | bypass | | 8 | 4 | 0 | 1 | 13 | 2 | PM1L3 |
| M1S4 | | | | bypass | 8 | 4 | 2 | 0 | 14 | 1 | PM1L4 |

FF NUMBER INFORMATION IN THE CASE WHERE THE NUMBER OF BYPASS STAGES IS TWO  R2_2

| MODE SETTING | BYPASS STAGE SELECTION PATTERN | | | | NUMBER OF FF IN EACH STAGE | | | | FF NUMBER OF CIRCUIT | | MODE SETTING RANKINGS |
|---|---|---|---|---|---|---|---|---|---|---|---|
| | S1 | S2 | S3 | S4 | S1 | S2 | S3 | S4 | TOTAL | NUMBER OF DELETION | |
| M2S13 | bypass | | bypass | | 0 | 4 | 0 | 1 | 5 | 10 | PM2L2 |
| M2S24 | | bypass | | bypass | 8 | 0 | 2 | 0 | 10 | 5 | PM2L5 |
| M2S12 | bypass | bypass | | | 0 | 0 | 2 | 1 | 3 | 12 | PM2L1 |
| M2S34 | | | bypass | bypass | 8 | 4 | 0 | 0 | 12 | 3 | PM2L6 |
| M2S14 | bypass | | | bypass | 0 | 4 | 2 | 0 | 6 | 9 | PM2L3 |
| M2S23 | | bypass | bypass | | 8 | 0 | 0 | 1 | 1 | 6 | PM2L4 |

• • •

BYPASS STAGE INFORMATION 33

| MODE SETTING | BYPASS STAGE SELECTION PATTERN | |
|---|---|---|
| | S2 | S3 |
| M0 | | |
| M1S2 | bypass | |
| M1S3 | | bypass |
| M2S23 | bypass | bypass |

DECODE TABLE 33D

| MODE SETTING | | BYPASS STAGE SELECTION PATTERN | |
|---|---|---|---|
| NAME | MODE | S2 | S3 |
| M0 | 2'b00 | 0 | 0 |
| M1S2 | 2'b10 | 1 | 0 |
| M1S3 | 2'b01 | 0 | 1 |
| M2S23 | 2'b11 | 1 | 1 |

METHOD, DESIGN PROGRAM, AND DESIGN APPARATUS OF A HIGH LEVEL SYNTHESIS PROCESS OF A CIRCUIT

CROSS-REFERENCE TO RELATED APPLICATION

This application is a continuation application of International Application PCT/JP2016/063340, filed on Apr. 28, 2016 and designated the U.S., the entire contents of which are incorporated herein by reference. Further, this application is based upon and claims the benefit of priority from the prior Japanese Patent Application No. 2015-244798, filed on Dec. 16, 2015, the entire contents of which are incorporated herein by reference.

FIELD

The embodiments discussed herein relates to a design method, a design program, and a design apparatus.

BACKGROUND

The mainstream of an integrated circuit design is an RTL (Register Transfer Level) design which uses a hardware description language (HDL). The level of abstraction of the design of the RTL design is higher than that of a gate level design, and hence it is possible to increase the speed of development.

On the other hand, the RTL design is becoming incapable of coping with the circuit scale of the integrated circuit which becomes larger and larger every year, and the use of a high level design having the level of abstraction higher than that of the RTL design is started. In the high level design, the behavioral description of the integrated circuit is generated by using C/C++ language or System C having a class library for a hardware description, and a high level synthesis (also referred to as behavioral synthesis or functional synthesis) tool converts the behavioral description in C language or the like to a functional description which is an RTL description. Thereafter, similarly to the RTL design, a logic synthesis tool converts the RTL functional description to a logic description which is a gate description (or a net list), an automatic wiring tool further performs a layout design based on the net list, and mask data for an SoC (System On Chip) is generated. Alternatively, a logic synthesis tool for an FPGA (Field Programmable Gate Array) generates configuration data for the FPGA from the RTL functional description.

Thus, in the high level design, the high level synthesis tool which converts the behavioral description in the C language or the like to the functional description in the HDL is used. The high level synthesis tool generates the hardware description in the HDL having various circuit configurations from source code described in a software language having a high level of abstraction based on a constraint of a high level synthesis. Examples of the constraint of the high level synthesis include operation speed (clock frequency), latency (the number of clocks from input to output), the number of arithmetic circuits or memories, a circuit scale, and a circuit area.

PRIORITY LIST

Patent Literature

Patent Literature 1: Japanese Patent Application Publication No. 2014-6650
Patent Literature 2: Japanese Patent Application Publication No. H10-63713

SUMMARY

However, in the high level design, after the behavioral description in the C language or the like is once converted to the functional description in the HDL, it is not easy to change the circuit of the functional description in the HDL. In general, the readability of the HDL is low and it is difficult to change the HDL artificially. Consequently, in order to change the circuit configuration, the high level synthesis needs to be performed again by changing the constraint of the high level synthesis.

In addition, there is a scene in which, after the integrated circuit is produced and implemented, it is desired to temporarily reduce power consumption by reducing the speed (clock frequency) of the integrated circuit or the latency (the number of clocks from input to output) thereof, or it is desired to improve throughput by increasing the speed to increase the latency conversely. However, the change of the circuit configuration of the produced integrated circuit needs high cost. Consequently, in the case where the circuit generated under a high-spec high level synthesis constraint in which the clock frequency is higher and the latency is thereby longer is caused to operate, the circuit operates at an excessive throughout than necessary, and extra energy is consumed. Conversely, in the case where the circuit generated under a low-spec high level synthesis constraint in which the clock frequency is lower and the latency is thereby shorter is caused to operate, power consumption is low but it is not possible to increase the clock frequency to thereby increase the latency.

According to the first aspect of the disclosure, a design method including a high level synthesis process, the design method includes: generating a hardware description of a circuit and high level synthesis report information from a source code in which a behavior of the circuit is described in a software language, based on a high level synthesis constraint, the hardware description describing a circuit including a plurality of stages each having a stage circuit and an inter-stage register provided between the plurality of stages; determining a bypass stage selection pattern based on bypass constraint information including a constraint condition related to a bypass of the inter-stage register and the high level synthesis report information, the bypass stage selection pattern including a plurality of patterns each having a combination of stages of inter-stage registers for which bypass setting is performed among stages of bypass setting-capable inter-stage registers; and generating bypass report information based on the bypass stage selection pattern, the bypass report information including combination information of the inter-stage registers for which the bypass setting is performed corresponding to a priority condition.

The object and advantages of the invention will be realized and attained by means of the elements and combinations particularly pointed out in the claims. It is to be understood that both the foregoing general description and the following detailed description are exemplary and explanatory and are not restrictive of the invention.

Figure 3:
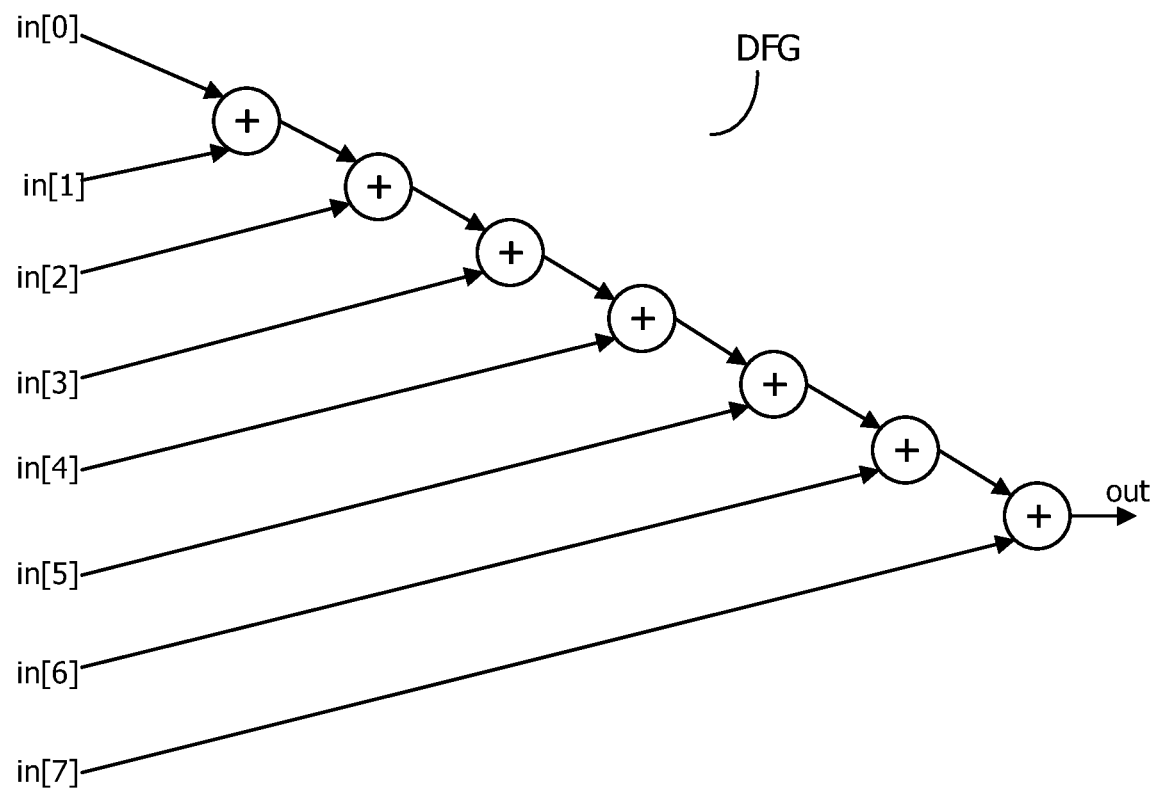
Figure 4:
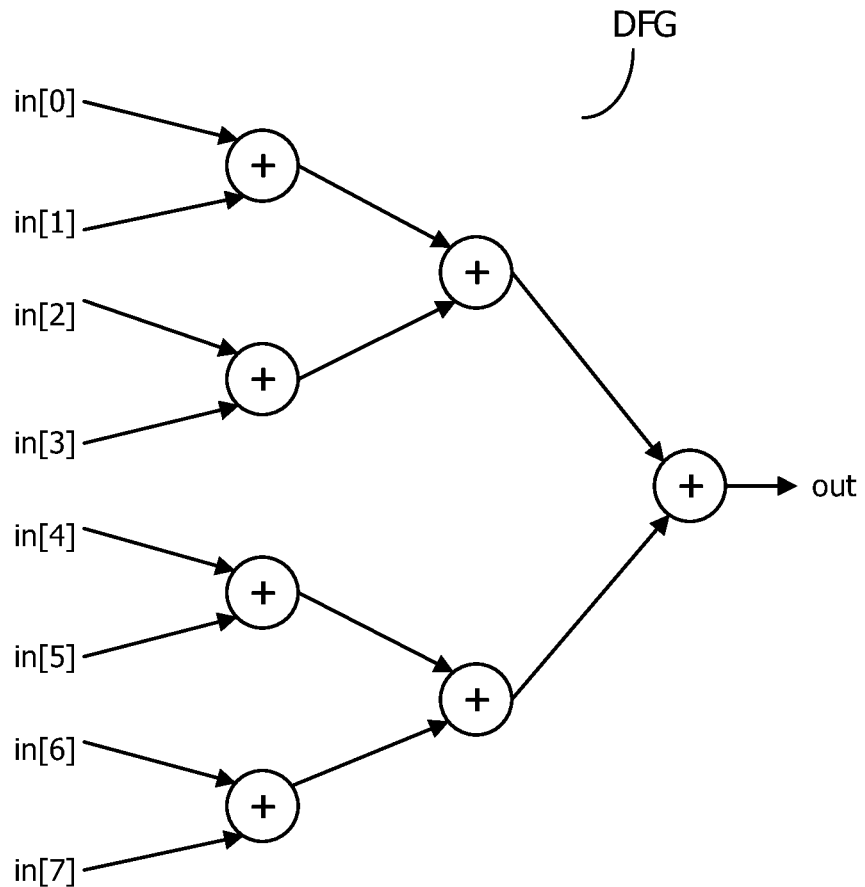

Each of FIGS. 3 and 4 is a diagram illustrating an example of a data flow graph DFG serving as the source for the circuit in the case where the high level synthesis of the source code is performed.

Figure 5:
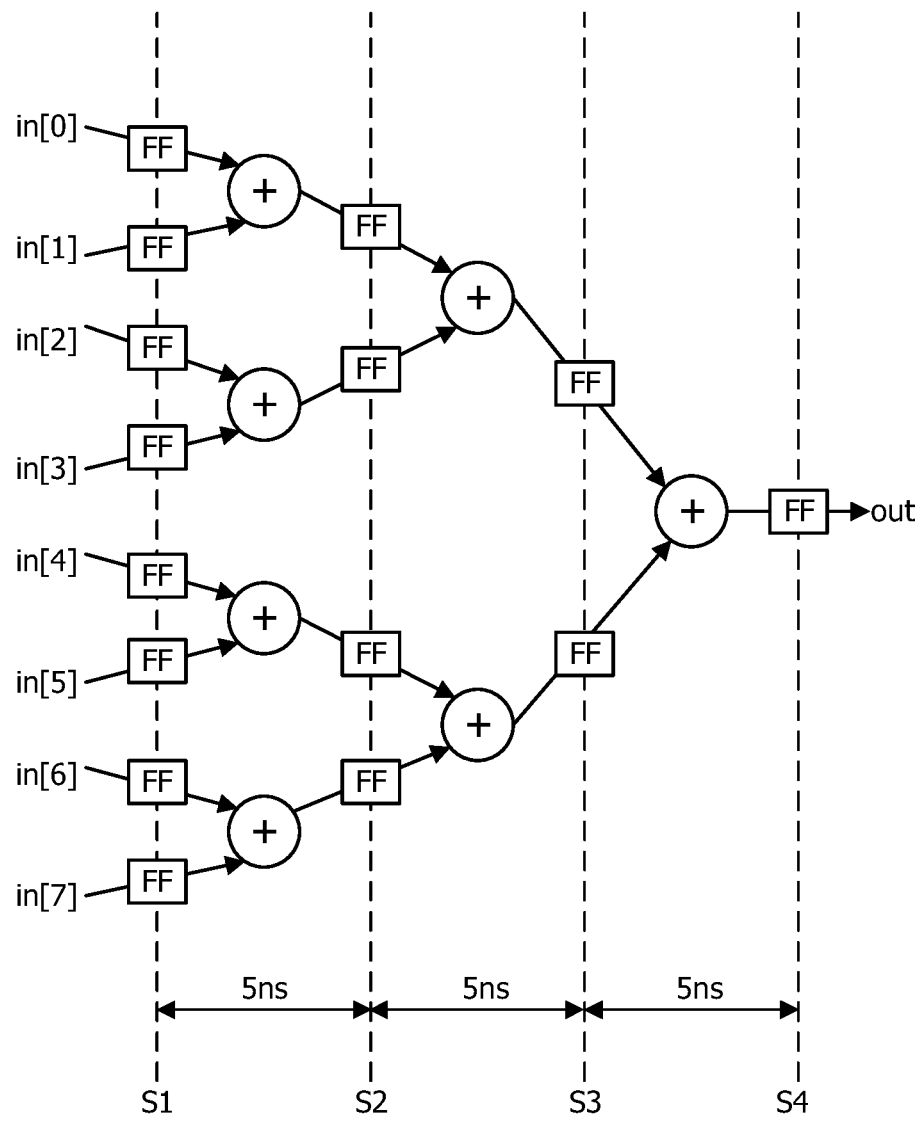

FIG. 5 is a diagram illustrating an example of a circuit generated in the case where the high level synthesis constraint is set to a clock frequency of 200 MHz.

Figure 6:
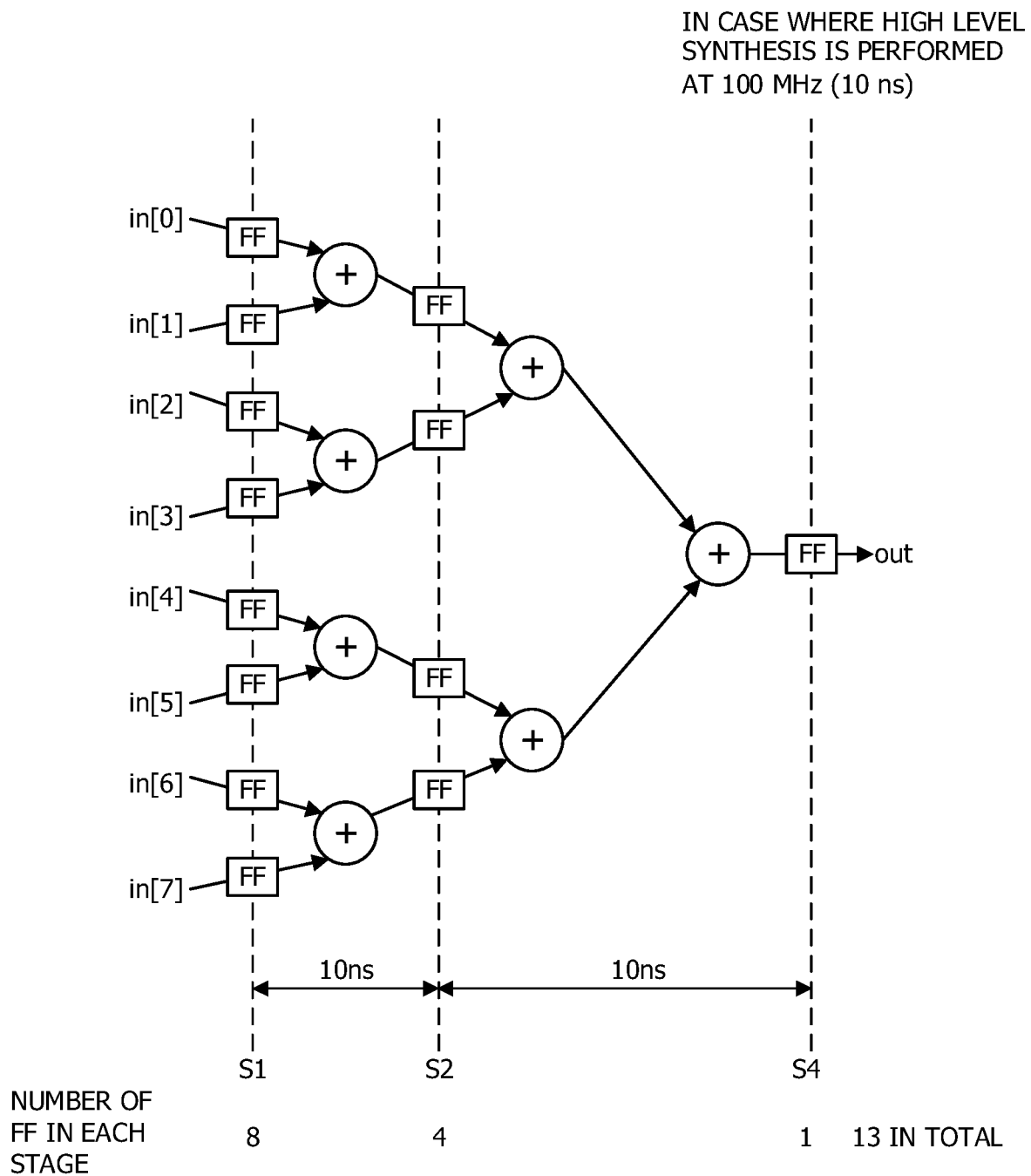
Figure 7:
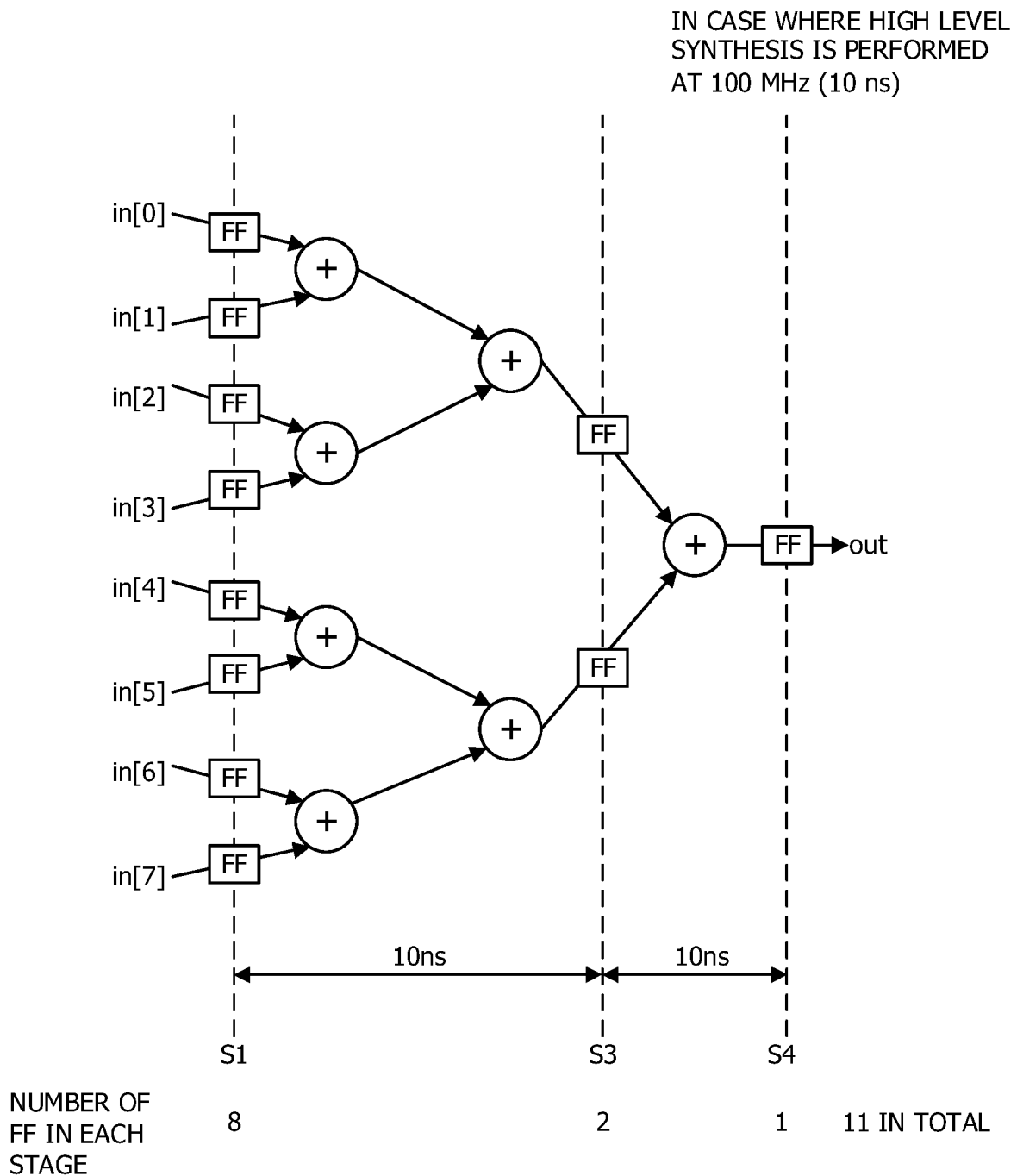

Each of FIGS. 6 and 7 is a diagram illustrating an example of a circuit generated in the case where the high level synthesis constraint is set to a clock frequency of 100 MHz.

Figure 8:
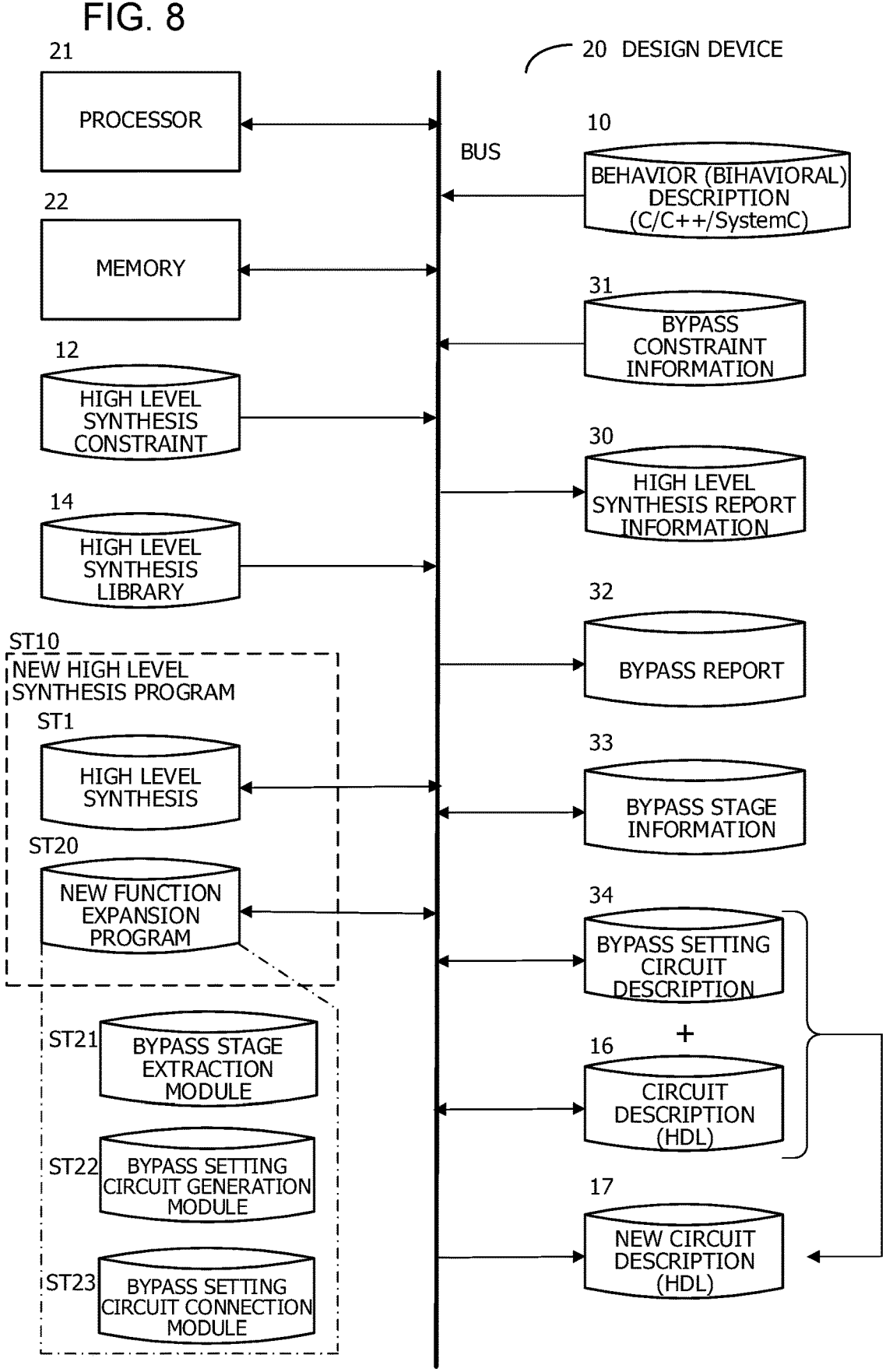

FIG. 8 is a diagram illustrating an example of a design apparatus 20 in the present embodiment.

Figure 9:
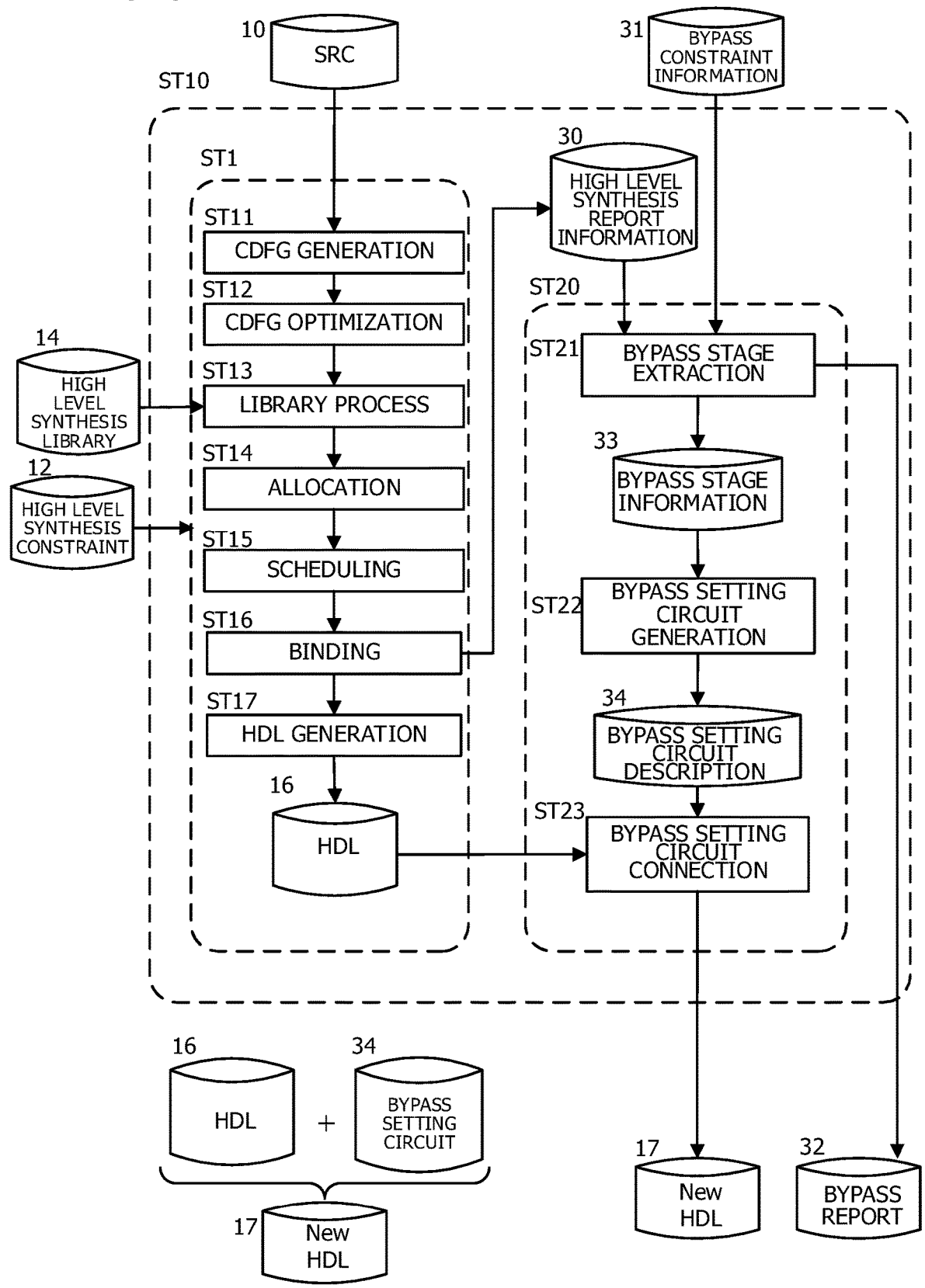

FIG. 9 is a flowchart of the high level synthesis program ST10 in the present embodiment.

FIG. 10 is a diagram illustrating examples of the inter-stage register and the bypass setting-capable inter-stage register.

Figure 11:
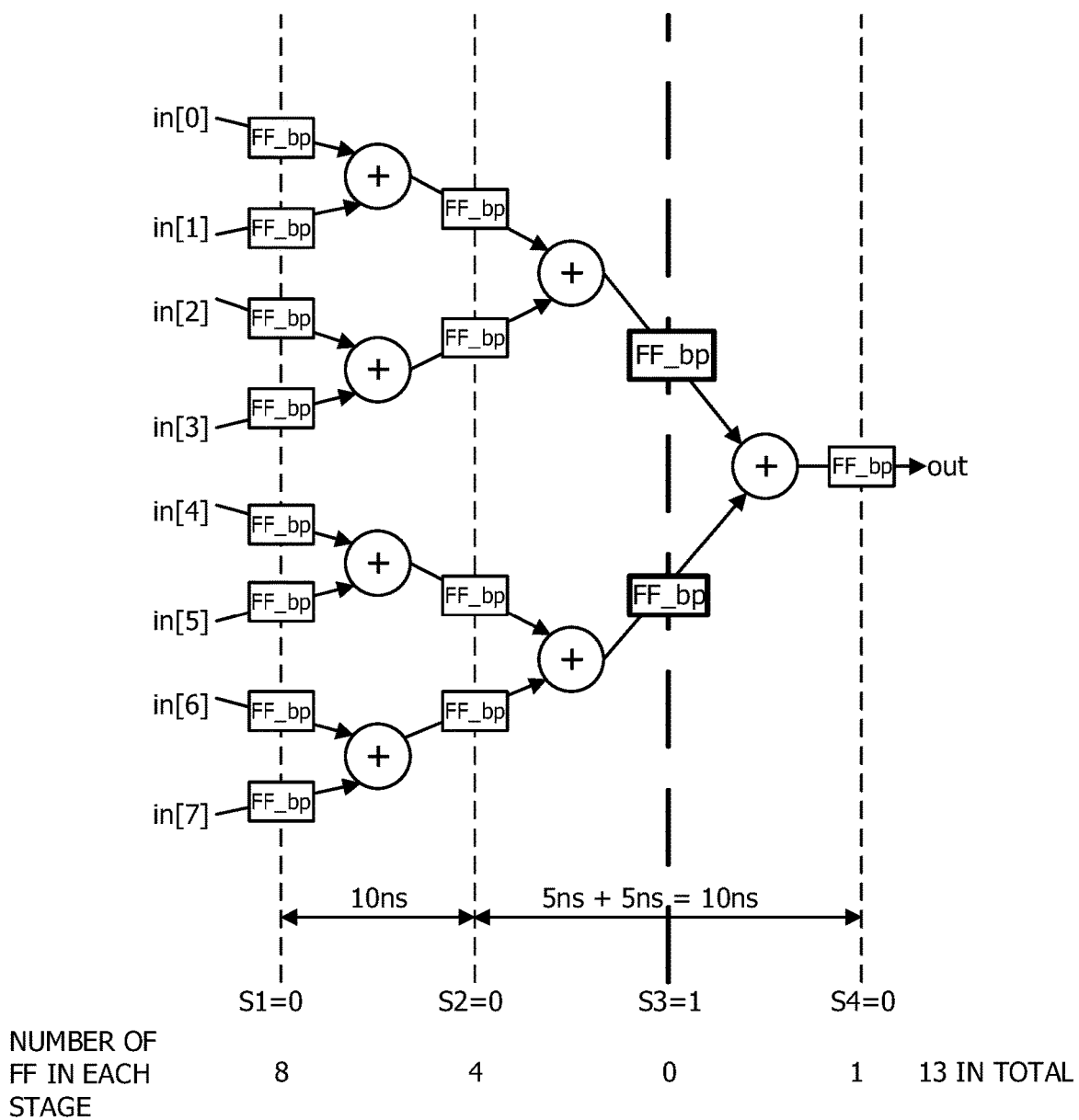

FIG. 11 is a diagram illustrating an example of a circuit generated by the high level synthesis in the present embodiment.

FIG. 12 is a diagram illustrating an example of the bypass constraint information.

FIG. 13 is a diagram illustrating the summary of the bypass stage extraction step.

Figure 14:
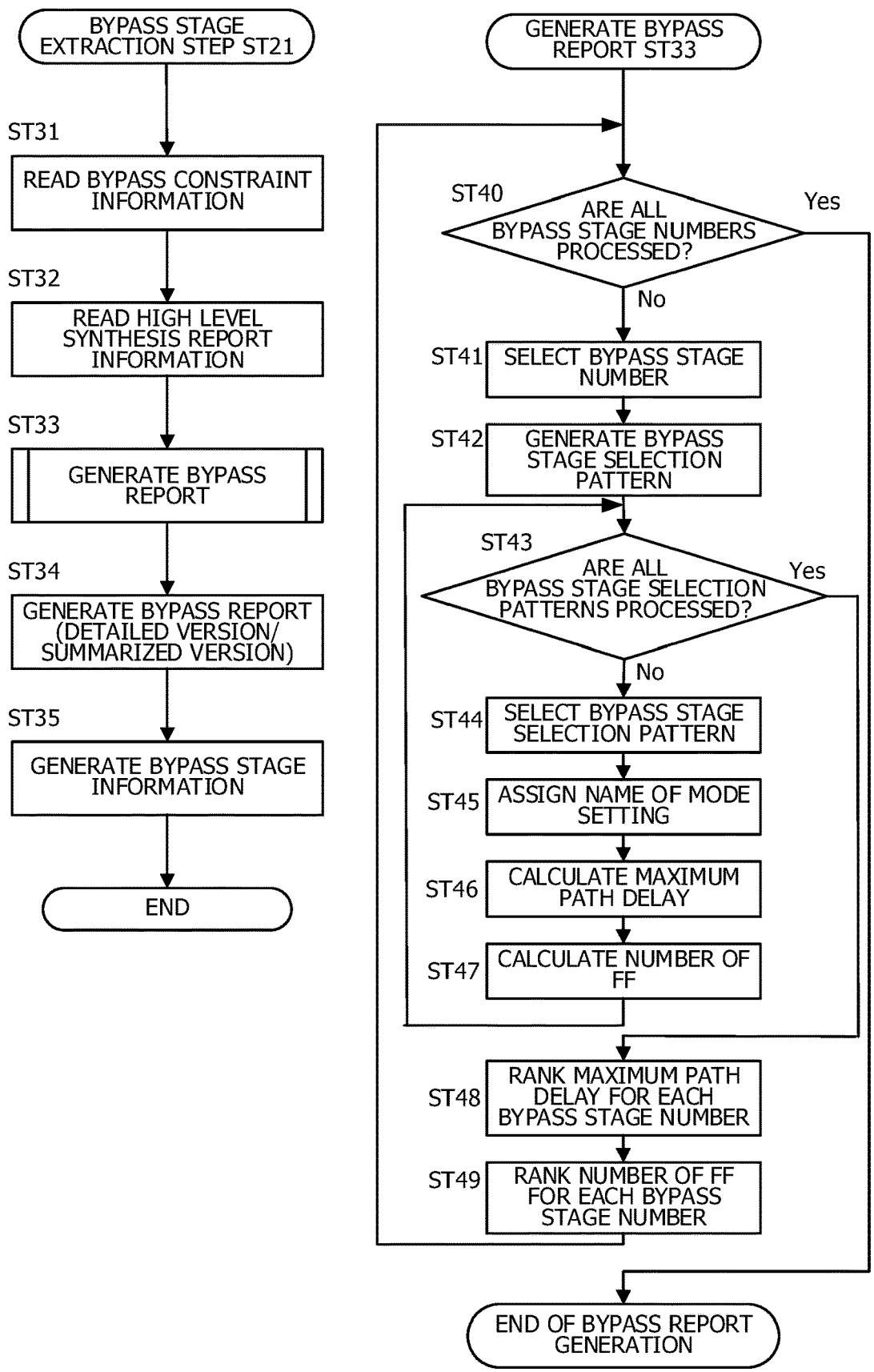

FIG. 14 is a flowchart of the bypass stage extraction step ST21.

FIG. 15 is a diagram illustrating an example of a detailed version of the bypass report.

FIG. 16 is a diagram illustrating an example of the summarized version of the bypass report.

Figure 17:
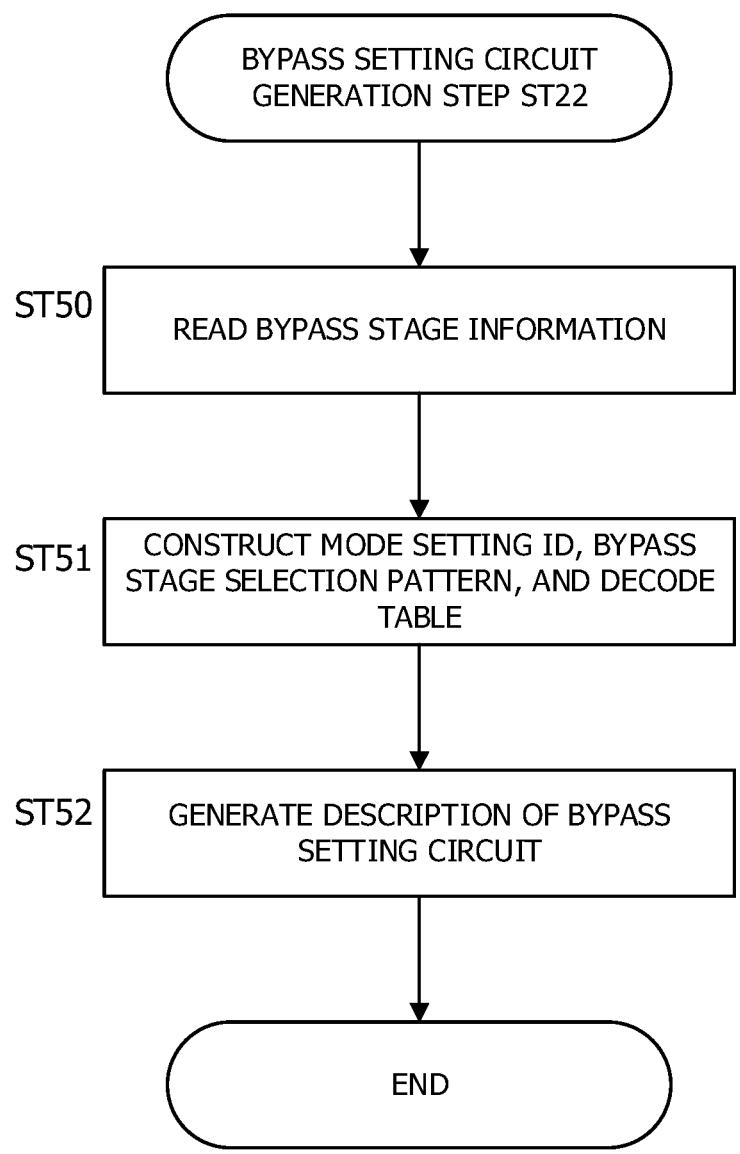

FIG. 17 is a flowchart of the bypass setting circuit generation step ST22.

FIG. 18 is a diagram illustrating examples of the bypass stage information, a decode table, and the bypass setting circuit.

Figure 19:
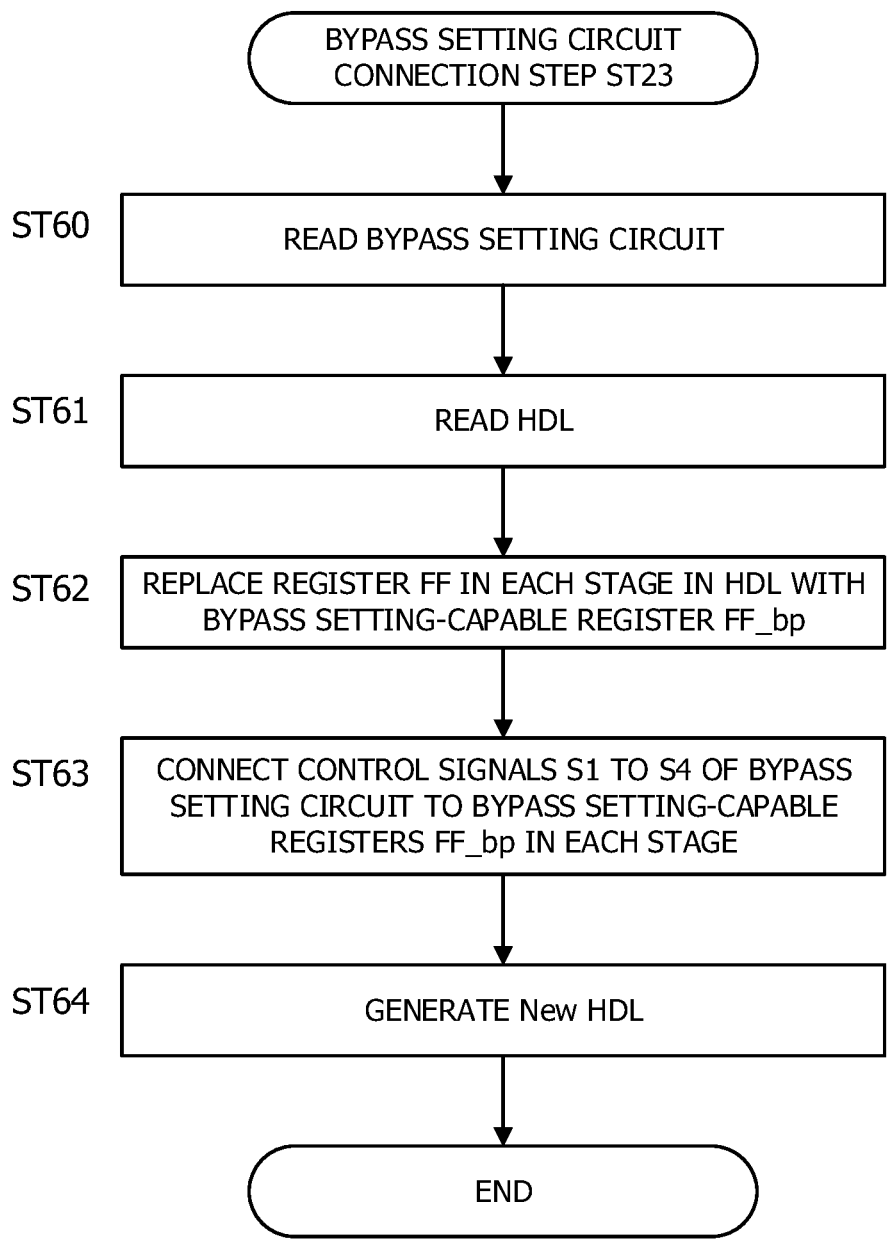

FIG. 19 is a flowchart of the bypass setting circuit connection step ST23.

Figure 20:
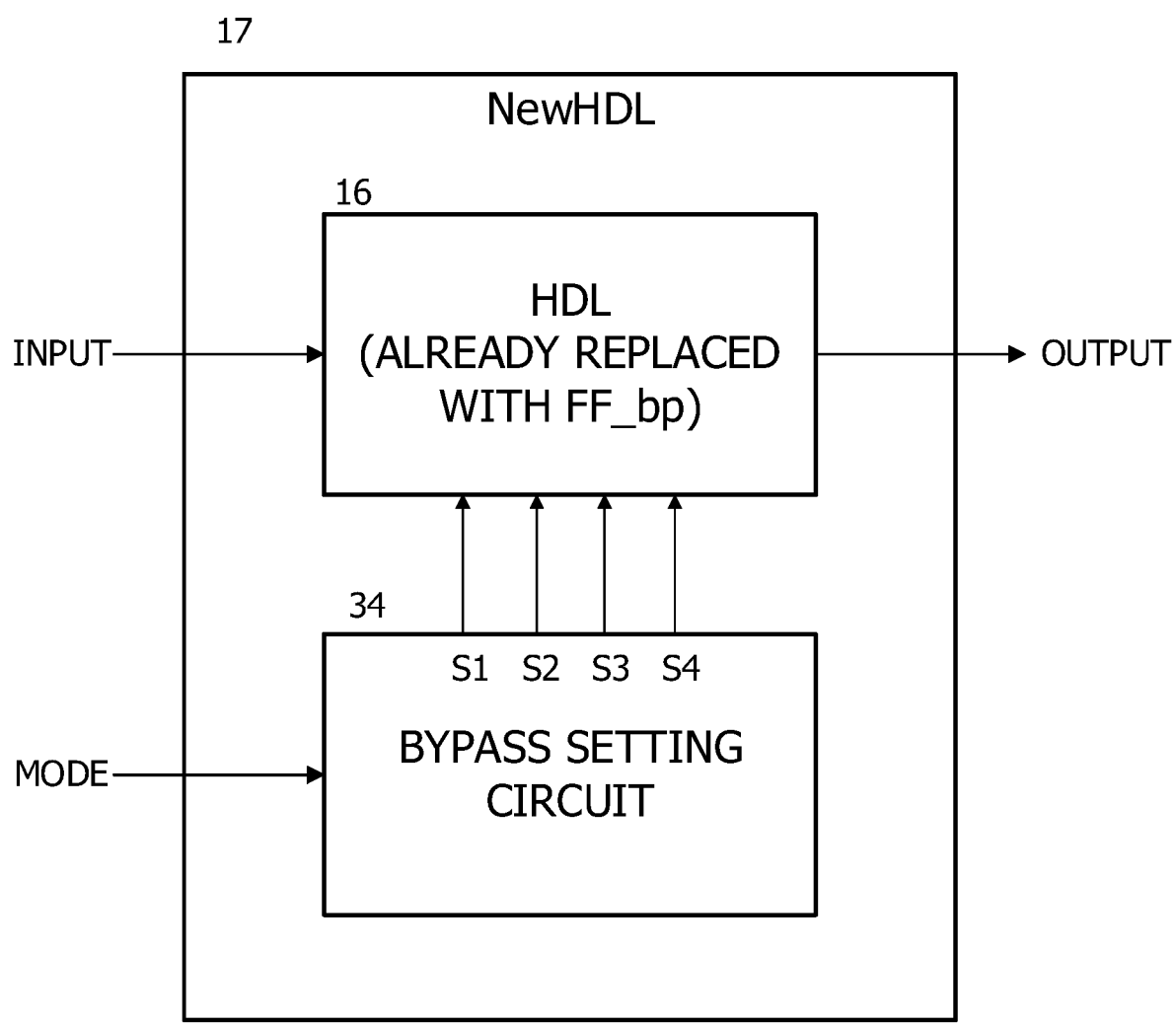

FIG. 20 is a diagram illustrating a new circuit after the bypass setting circuit is connected.

Figure 21:
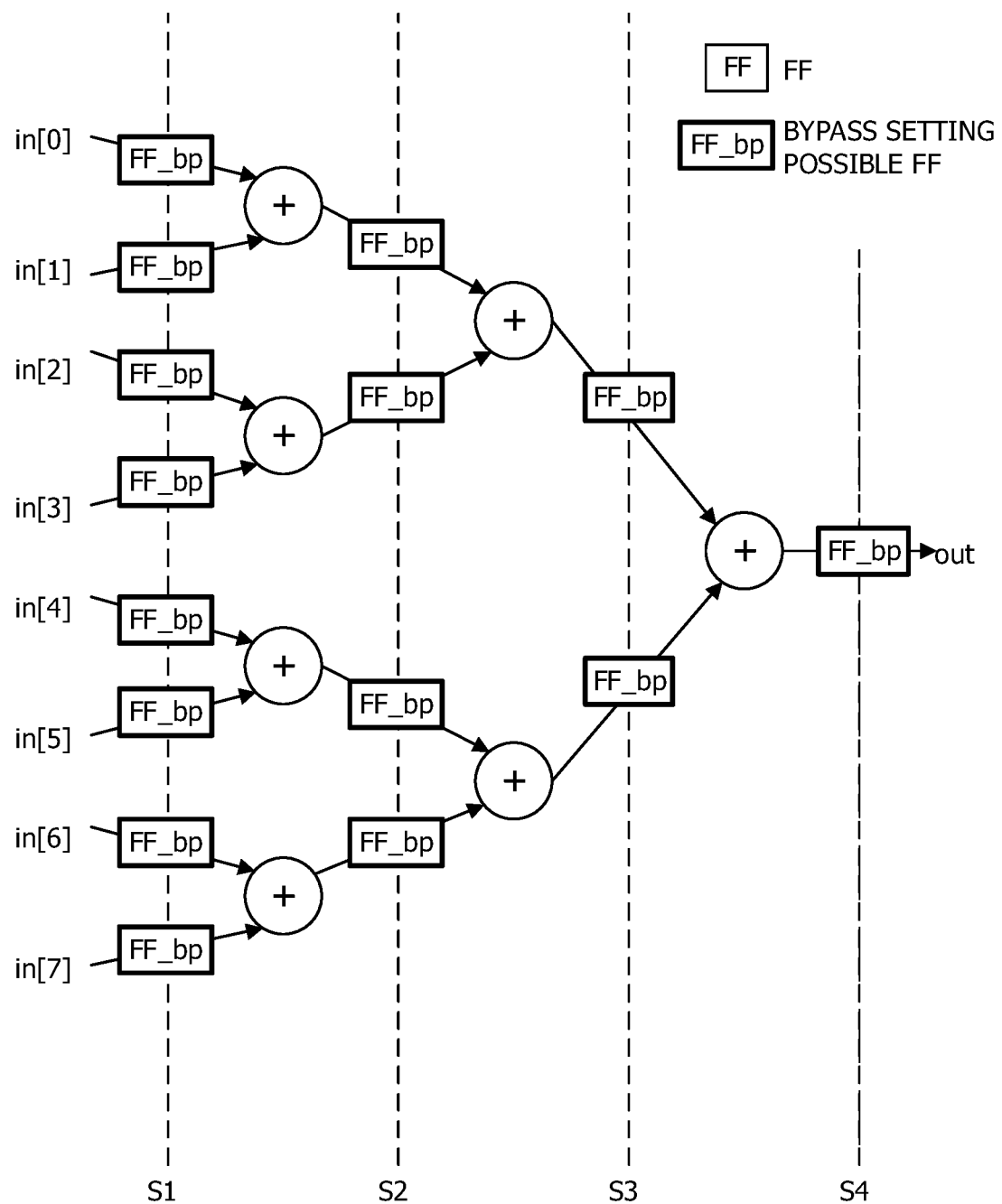
Figure 22:
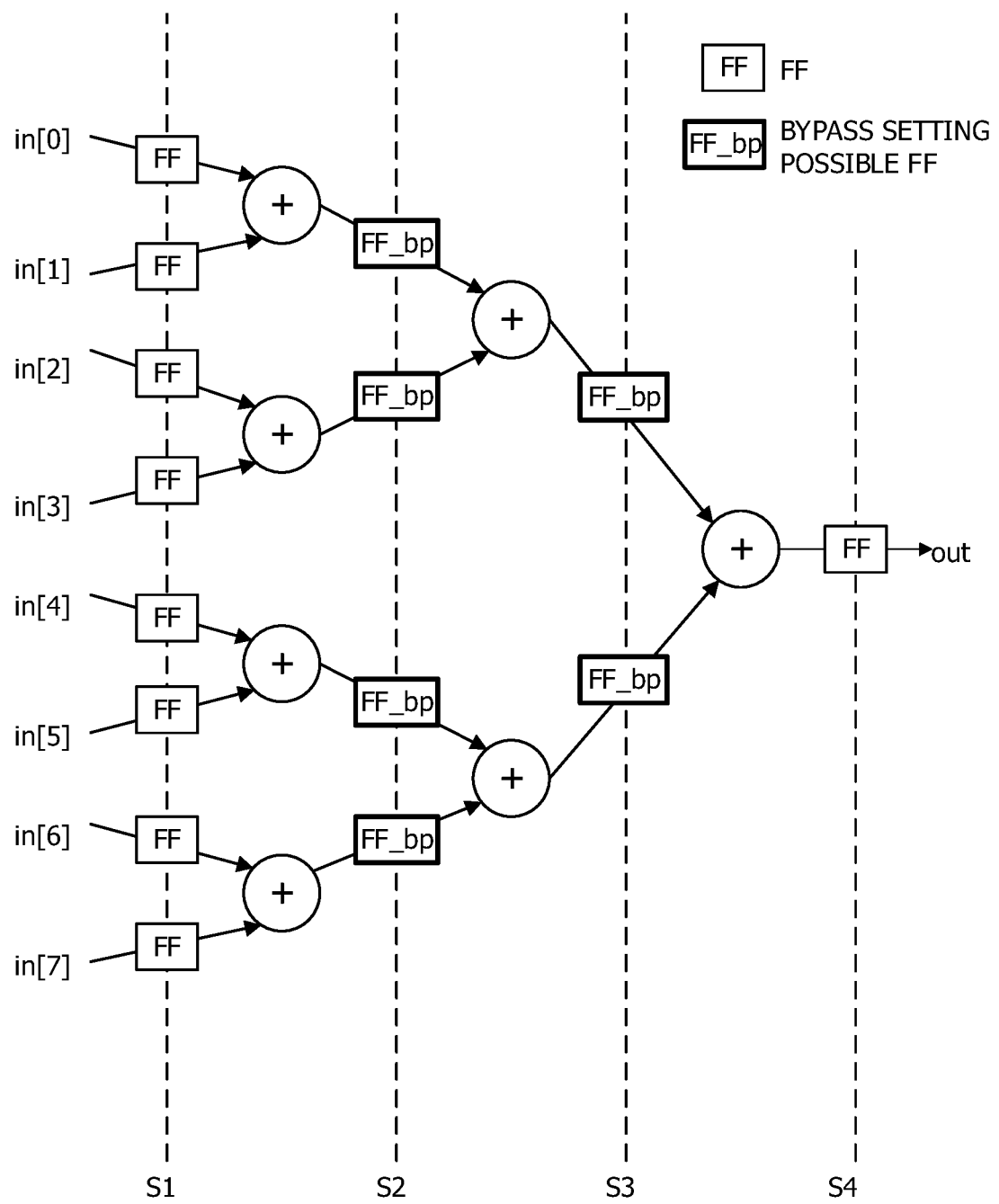

Each of FIGS. 21 and 22 is a diagram illustrating the summary of the second embodiment.

Figure 23:
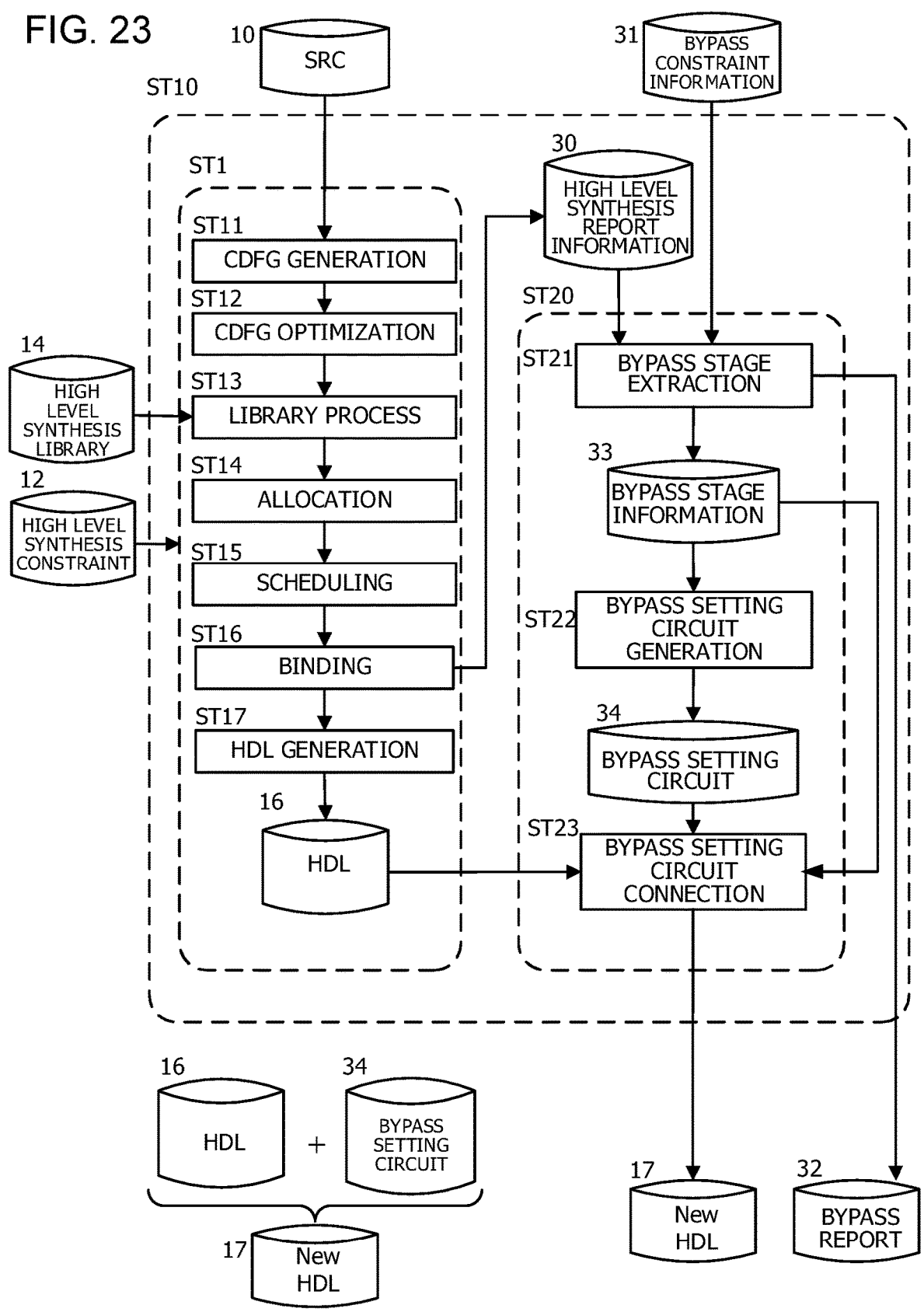

FIG. 23 is a flowchart of the high level synthesis program in the second embodiment.

Figure 24:
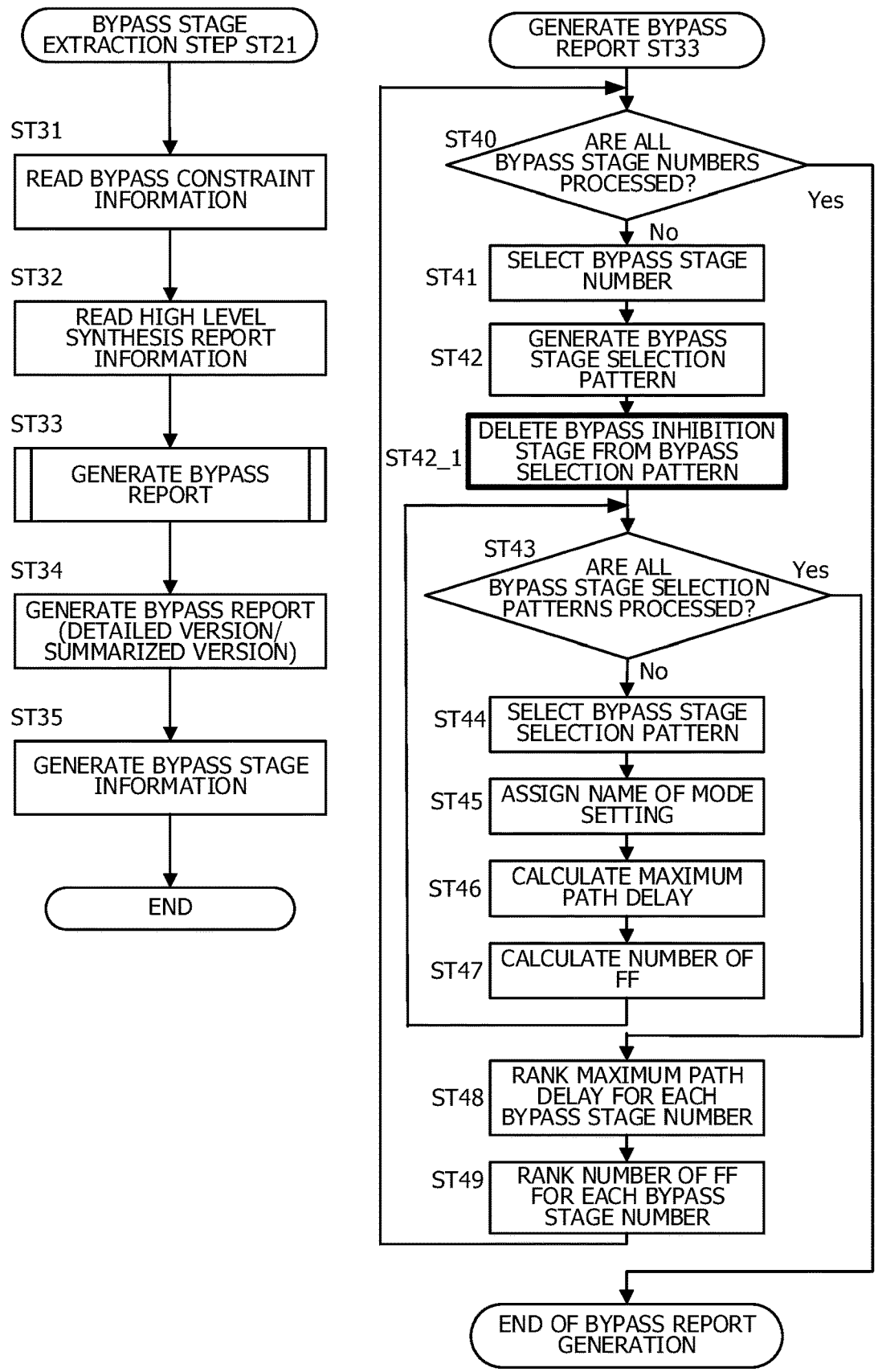

FIG. 24 is a flowchart of the bypass setting circuit connection step ST23 in the second embodiment.

FIG. 25 is a diagram illustrating an example of the detailed version of the bypass report in the second embodiment.

Figure 26:
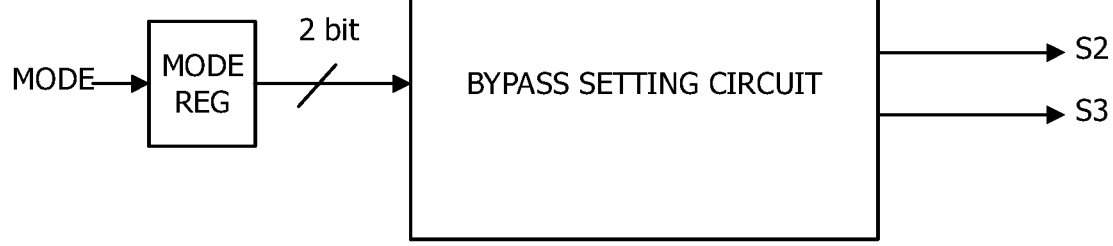

FIG. 26 is a diagram illustrating the bypass stage information, the decode table, and the bypass setting circuit.

Figure 27:
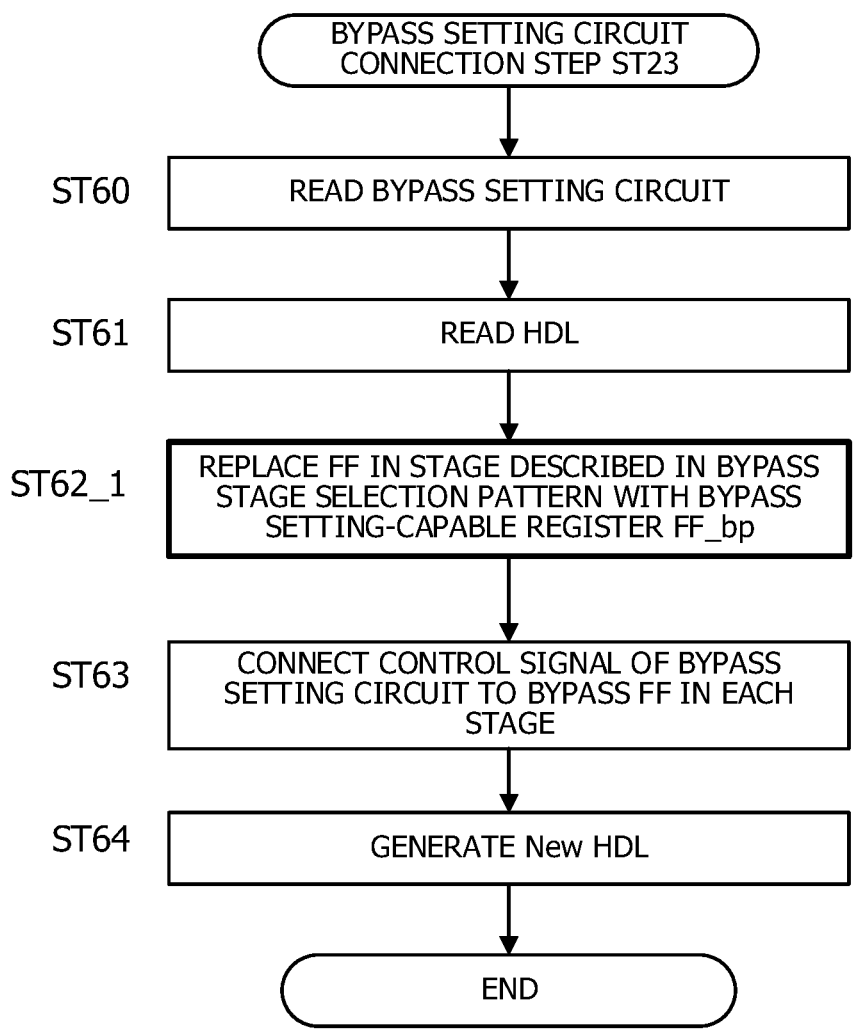

FIG. 27 is a flowchart of the bypass setting circuit connection step ST23 in the second embodiment.

Figure 28:
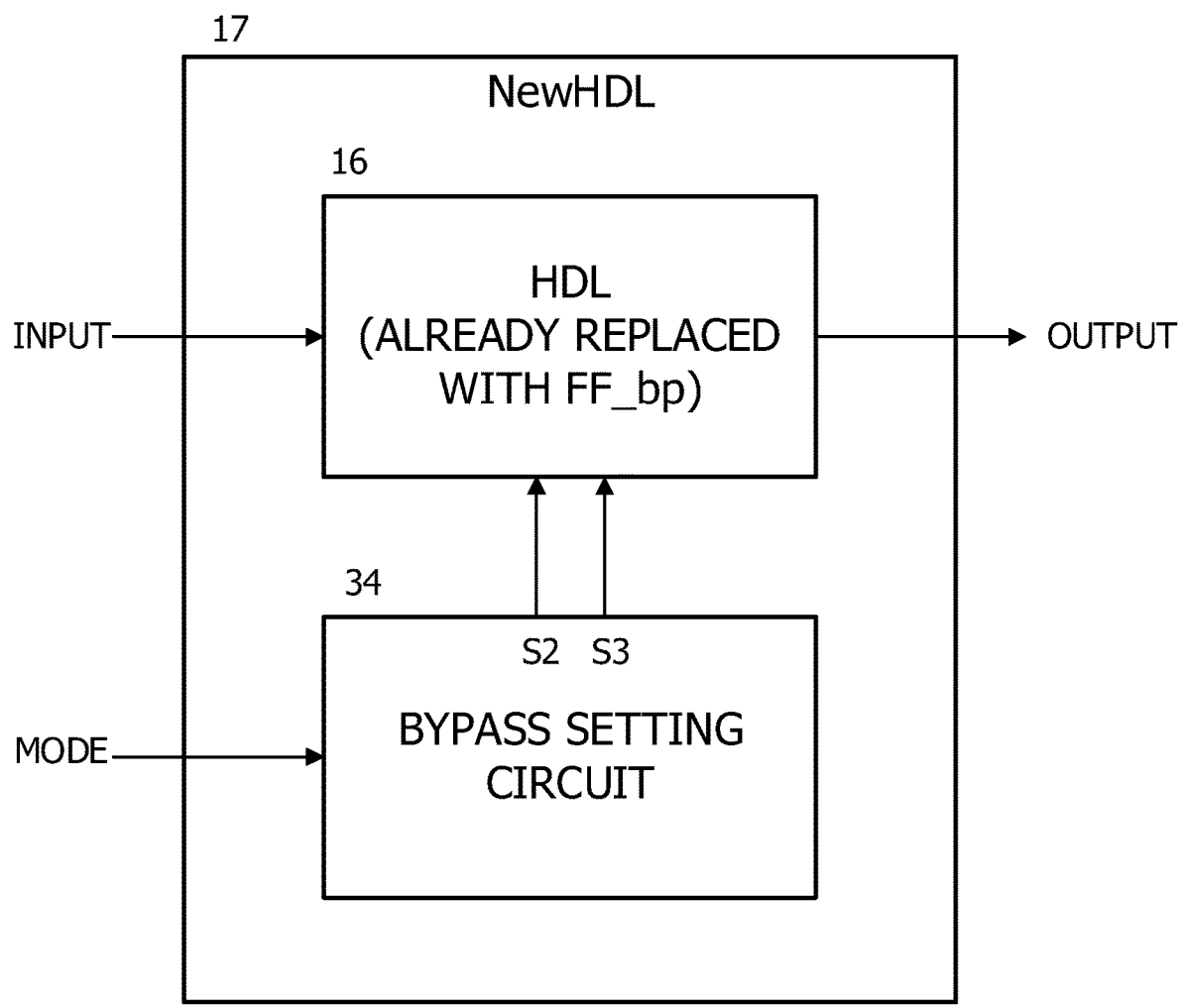

FIG. 28 is a diagram illustrating a circuit in a new HDL in which the bypass setting circuit in the second embodiment is connected.

Figure 29:
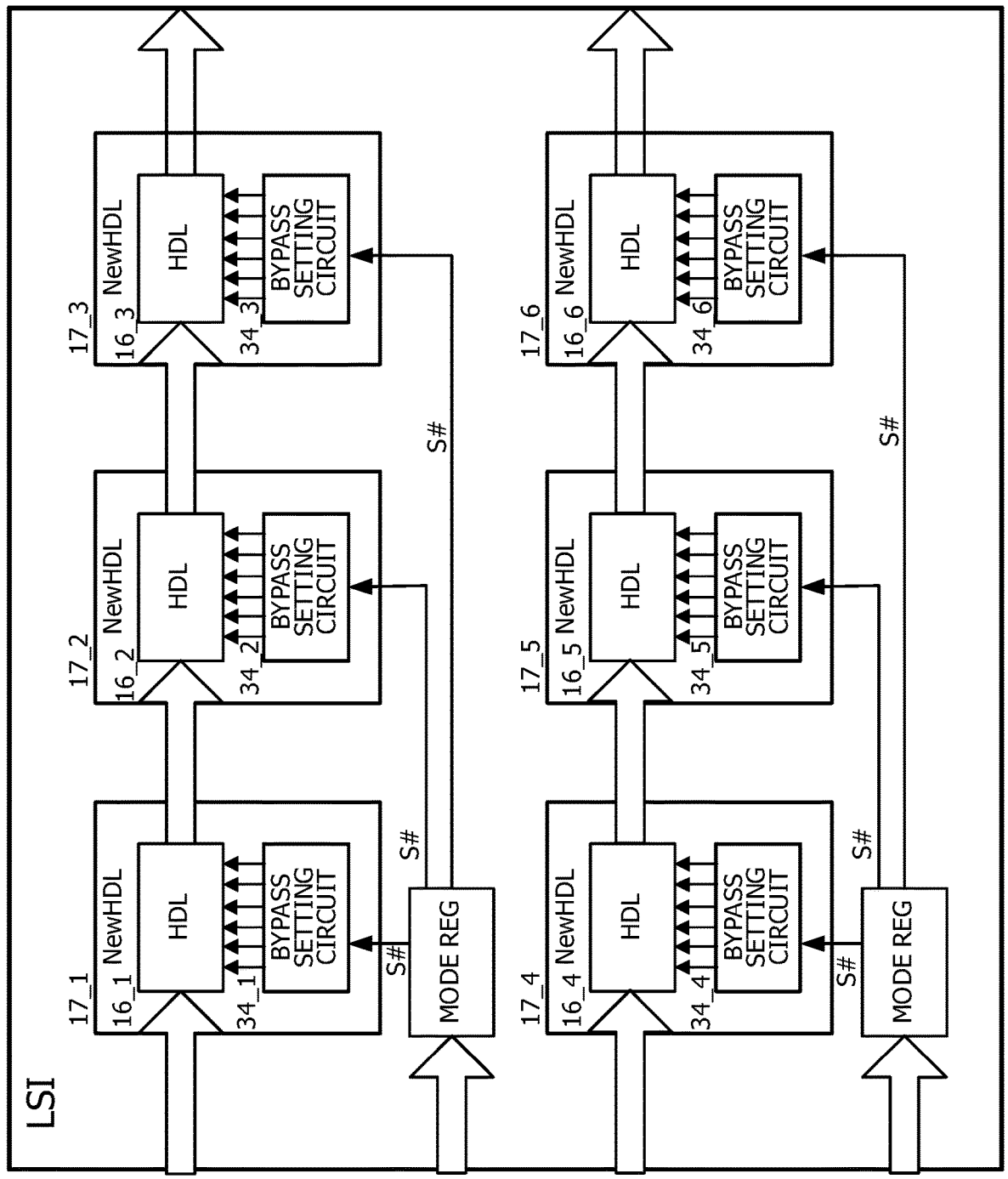

FIG. 29 is a diagram illustrating the configuration of the integrated circuit of the HDL description in the third embodiment.

DESCRIPTION OF EMBODIMENTS

Definitions of Terms

The following is the glossary of definitions of terms used in the present description.

High Level Synthesis (HLS): A high level synthesis is also referred to as a behavioral synthesis or a functional synthesis. The high level synthesis is a process for generating a hardware description in which the logic of a circuit is described in an RTL hardware description language (HDL) or the like from source code in which the behavior of the circuit is described in C language or the like. The process is performed using a high level synthesis program (or a high level synthesis tool).

High level synthesis constraint: A high level synthesis constraint is a constraint of the circuit such as a clock frequency, a circuit area, a circuit scale, power consumption, or the number of computing units, and is set in the high level synthesis.

High level synthesis library: A high level synthesis library is also referred to as a technology library, and is a parameter corresponding to a production line of the circuit, and includes the speed of a circuit element such as a gate, the power consumption of the circuit element, the area of the circuit element, and a power supply voltage. The high level synthesis tool estimates the timing, area, and power consumption of the circuit based on these parameters.

High level synthesis report: A high level synthesis report is a report generated by the high level synthesis tool, and has the delay time of each stage and the number of inter-stage registers on the output side of each stage in the circuit of the hardware description.

Bypass constraint: A bypass constraint is a constraint in the case where the inter-stage register is converted to a bypass setting-capable register (bypass-candidate inter-stage register), and is, e.g., any of or any combination of the constraints such as the number of stages of inter-stage registers for which bypass setting is permitted (bypass setting-capable inter-stage registers), a specific inter-stage register for which the bypass setting is permitted, a specific inter-stage register for which bypass setting is inhibited (bypass setting-incapable inter-stage register), and the minimum value of the number of consecutive inter-stage registers for which the bypass is inhibited.

Bypass report: A bypass report is a report in which bypass stage selection patterns are ranked according to a priority condition.

Bypass stage: A bypass stage is a stage in which all inter-stage registers provided on the output side of the stage of the circuit are bypassed. Alternatively, all inter-stage registers which are provided on the output side of the stage and for which the bypass setting is performed are collectively referred to as a "bypass stage".

Circuit stage: A circuit stage is a combinational circuit sandwiched between the inter-stage register on the input side and the inter-stage register on the output side.

Inter-stage register: An inter-stage register is a register provided between the circuit stages.

Bypass-candidate inter-stage register: A bypass-candidate inter-stage register is a bypass setting-capable register.

Inter-stage register for which bypass setting is performed: An inter-stage register for which bypass setting is performed is a bypass set register.

Bypass stage selection pattern: A bypass stage selection pattern is a pattern which has a combination of, among stages of the bypass setting-capable registers (bypass-candidate registers), stages of the bypass set registers.

Bypass stage information: Bypass stage information is information having all of the bypass stage selection patterns.

Bypass setting circuit: A bypass setting circuit is a circuit which performs the bypass setting of the bypass setting-capable register, and is a circuit which generates a bypass control signal for bypass setting or bypass non-setting in accordance with a mode setting value corresponding to a combination of the registers for which the bypass setting is performed, and outputs the bypass control signal to each bypass setting-capable register.

SRC: SRC is source code described in a high-level language, and includes C language, C++ language, and System C language.

FF: An FF is a flip-flop, and is the inter-stage register.

EDA: EDA is an abbreviation of Electric Design Automation, and is a generic name for a method for automating a design operation of a semiconductor or the like.

CFG: CFG is an abbreviation of Control Flow Graph, and is a graph representing the procedure of control of the circuit.

DFG: DFG is an abbreviation of Data Flow Graph, and is a graph representing the flow of data in the circuit.

CDFG: CDFG is an abbreviation of Control Data Flow Graph, is a graph in which the CFG and the DFG are combined, and is generated inside at the time of the high level synthesis.

FSM: FSM is an abbreviation of Finite State Machine, and is a finite state machine for control.

[High Level Synthesis]

Figure 1:
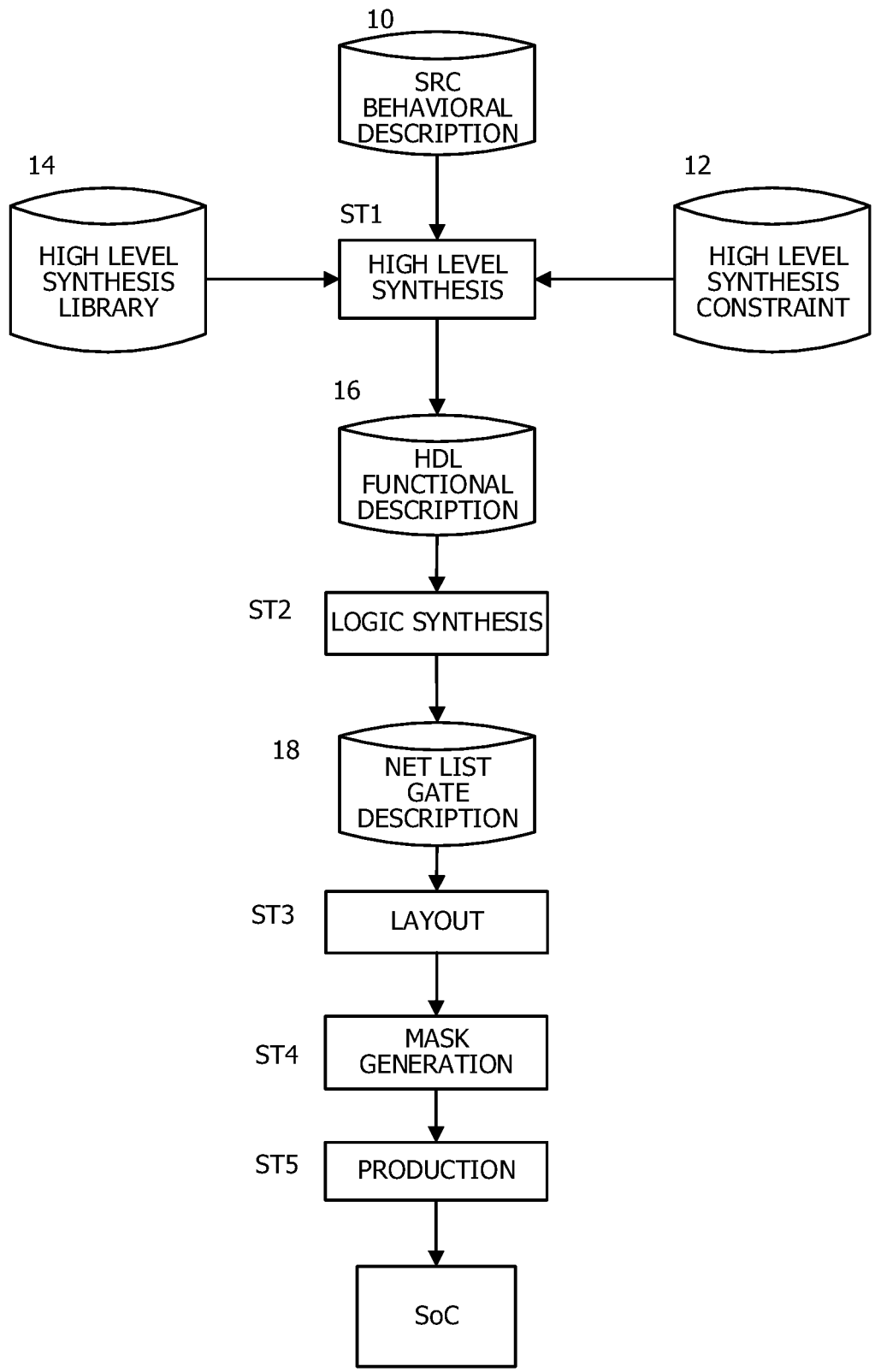
FIG. 1 is a flowchart illustrating design steps of an integrated circuit which includes the high level synthesis.

First, a high level synthesis will be briefly described. FIG. 1 is a flowchart illustrating design steps of an integrated circuit which includes the high level synthesis. The design steps of the integrated circuit include a high level synthesis step ST1 of generating a hardware description 16 in which the function of the circuit is described in an HDL based on a high level synthesis constraint 12 and a high level synthesis library 14 from source code 10 in which the behavior of the circuit is described in C language or the like based on the specifications of the integrated circuit. The high level synthesis constraint 12 and the high level synthesis library 14 are as described in the glossary of definitions described above.

In addition, the design steps include a logic synthesis step ST2 of converting the hardware description 16 in the HDL to a net list 18 in which a gate is described, and a layout step ST3 of laying out circuit elements and wiring which connects the circuit elements based on the net list. The integrated circuit such as a system on a chip SoC is produced by a mask generation step ST4 of generating a mask from layout data generated in the layout step and a production step ST5 of forming the integrated circuit on a semiconductor substrate.

Further, although not illustrated in the drawing, a logic synthesis tool for an FPGA generates configuration data of an FPGA from the HDL description 16. Subsequently, the configuration data is downloaded to and is set in a field programmable gate array FPGA, and the FPGA is converted to the integrated circuit having a circuit configuration provided with the function of the HDL description.

Figure 2:
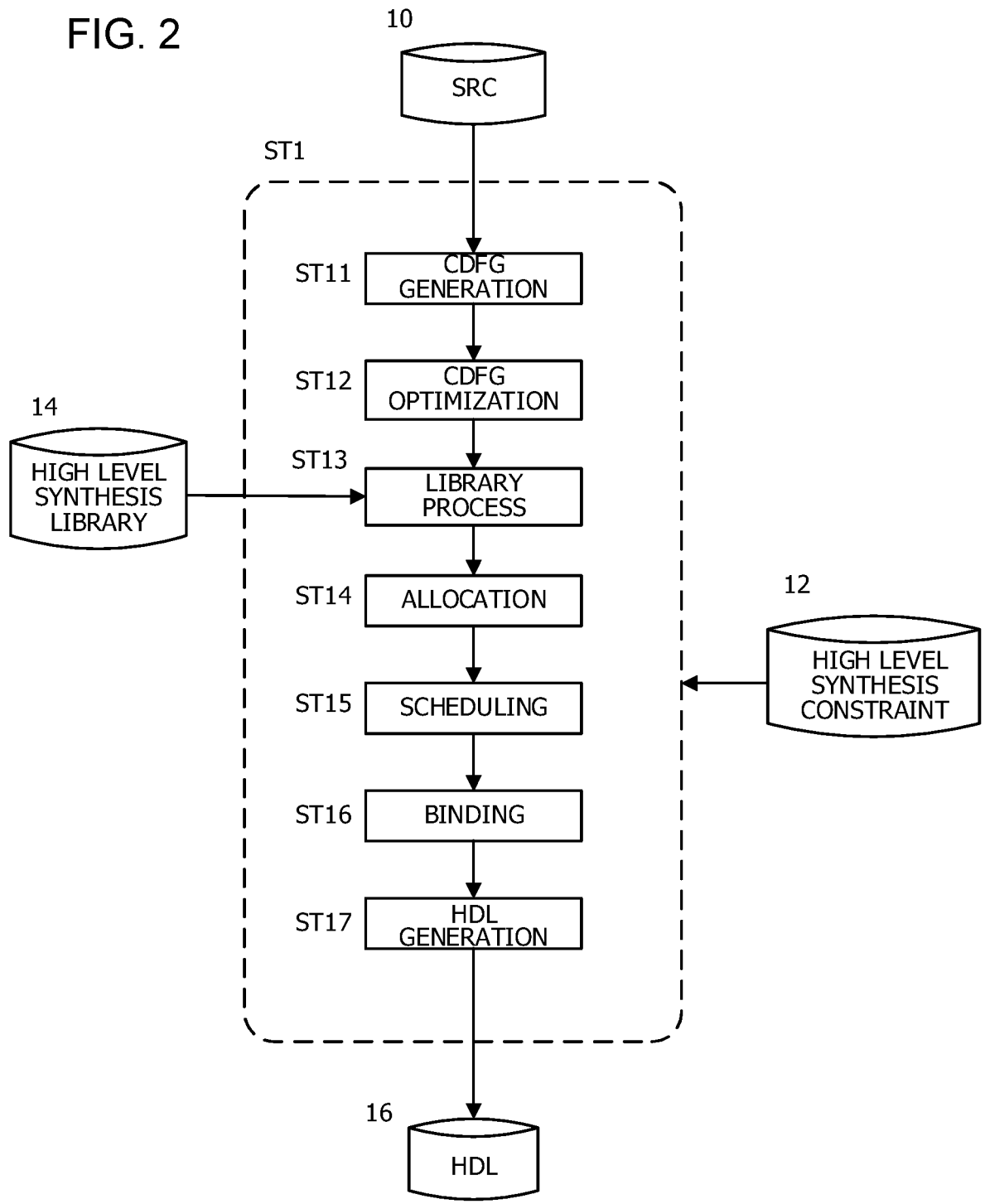
FIG. 2 is a flowchart of the high level synthesis step.

FIG. 2 is a flowchart of the high level synthesis step. The high level synthesis step ST1 has a CDFG generation step ST11 of interpreting the source code and generating a control data flow graph CDFG indicative of data dependence and control dependence between operations, an optimization step ST12 of optimizing the control data flow graph CDFG, and a library process step ST13 of extracting the library of a specified technology from the high level synthesis library 14.

In addition, the high level synthesis step ST1 has an allocation step ST14 of determining the type of a computing unit and the number of computing units, and a scheduling step ST15 of parallelizing operations in the CDFG based on the high level synthesis constraint 12 and determining an execution cycle. Examples of the scheduling include a resource constraint scheduling performed for the purpose of minimizing the latency (the number of clocks from input to output) of the circuit by using an operation resource as the constraint, and a time constraint scheduling performed for the purpose of minimizing the number of resources in the circuit by using the latency as the constraint conversely.

Further, the high level synthesis step ST1 has a binding step ST16 of mapping an operator in the CDFG to the computing unit and mapping a variable and an array to a register or a memory, and the circuit configuration having a combinational circuit and an inter-stage register of each stage is determined by the scheduling step and the binding step. Subsequently, lastly, in an HDL generation step ST17, the RTL description 16 in which a circuit block for implementing the determined circuit configuration is described is generated.

In general, the readability of the RTL description is low, therefore it is difficult for a person to modify the RTL description. Consequently, in order to change the clock frequency or the circuit configuration in the circuit of the RTL description generated by the high level synthesis, the RTL description needs to be generated from the source code by performing the high level synthesis again after changing the high level synthesis constraint. In addition, it is difficult to change the clock frequency or the circuit configuration of the SoC which is the integrated circuit produced from the RTL description, and the circuit design steps starting from the high level synthesis need to be performed again.

The high level synthesis synthesizes various circuits such as a circuit having high speed and a large scale and a circuit having low speed, a small scale, and low power consumption from the source code in which the algorithm of a sequential operation is described based on the resource constraint such as the number of the computing units or the number of memory ports and the time constraint such as the number of execution cycles or the delay time of each stage.

Each of FIGS. 3 and 4 is a diagram illustrating an example of a data flow graph DFG serving as the source for the circuit in the case where the high level synthesis of the source code is performed. Source code 10 in each of FIGS. 3 and 4 describes a behavior in which an accumulation value sum of eight pieces of data i[0] to i[7] is calculated and outputted.

A high level synthesis tool generates the data flow graph DFG illustrated in FIG. 3 or 4 in the process of high level synthesizing the source code 10. While an addition operation is sequentially executed similarly to the order of addition in the source code in the data flow graph DFG in FIG. 3, the execution order of the addition is changed and the addition operation is completed in three cycles by using four adders in the data flow graph DFG in FIG. 4. In these cases, while it is possible to have the circuit configuration in which one adder is caused to operate repeatedly, and reduce a circuit scale (circuit area) in the case of the data flow graph in FIG. 3, the circuit scale is large because the circuit has four adders, but it is possible to reduce the number of operation cycles (latency) to three in the case of the data flow graph in FIG. 4. The data flow graph described above is generated in the optimization step ST12.

As can be seen from examples in FIGS. 3 and 4, the circuit of the HDL description generated by the high level synthesis tool can have various configurations.

FIG. 5 is a diagram illustrating an example of a circuit generated in the case where the high level synthesis constraint is set to a clock frequency of 200 MHz. The data flow graph serving as the source for the circuit in FIG. 5 is the data flow graph in FIG. 4. By performing the scheduling and the binding on the data flow graph in FIG. 4, the circuit having inter-stage registers FF between the adders illustrated in FIG. 5 is generated.

In the example of the circuit in FIG. 5, between an input stage S1, three addition stages S2, S3, and S4, and an output stage, flip-flops FF serving as the inter-stage registers are mapped. The delay time of each of the three addition stages is 5 ns, which is equal to the period of the clock of 200 MHz. The latency from the input to the output is four clocks (cycles), and the numbers of the registers FF on the output sides of the input stage S1 and the three addition stages S2 to S4 are 8, 4, 2, and 1 respectively, and the total number thereof is 15.

The circuit in FIG. 5 can be operated at the maximum clock frequency of 200 MHz, and can also be operated at a clock frequency of 100 MHz when speed is not needed. However, the number of FF serving as the registers is always 15, and electric power saving is limited.

Each of FIGS. 6 and 7 is a diagram illustrating an example of a circuit generated in the case where the high level synthesis constraint is set to a clock frequency of 100 MHz. In the example of the circuit in FIG. 6, the flip-flops FF are mapped to the input stage S1, the first addition stage S2, and the third addition stage S4, and the flip-flop is not mapped to the second addition stage. As a result, the number of the addition stages is two, and the delay time of each stage is 10 ns which is equal to the period of the clock. The latency from the input to the output is three clocks. The flip-flop is not disposed on each of the output sides of two adders in the second stage, and hence the numbers of FF in the individual stages are 8, 4, and 1, and the total number thereof is 13.

On the other hand, in the example of the circuit in FIG. 7, the flip-flops FF are mapped to the input stage S1, the second addition stage S3, and the third addition stage S4, and the flip-flop is not mapped to the first addition stage. As a result, the number of the addition stages is two, and the delay time of each stage is 10 ns which is equal to the period of the clock. The latency from the input to the output is three clocks. The flip-flop is not disposed on each of the output sides of four adders in the first stage, and hence the numbers of FF of the individual stages are 8, 2, and 1, and the total number thereof is 11.

It is not possible to operate the circuit in each of FIGS. 6 and 7 at the maximum clock frequency of 200 MHz, but the circuit scale is reduced and electric power saving is allowed.

Thus, in the high level synthesis, it is possible to generate the descriptions of the circuits having various configurations by changing the high level synthesis constraint condition. It is possible to operate the circuit in FIG. 5 at a high-speed clock frequency of 200 MHz, and enhance performance which is data throughput. On the other hand, in the circuit in each of FIGS. 6 and 7, although it is not possible to operate the circuit at the high-speed clock frequency, the circuit scale is small, it is possible to reduce power consumption, and it is possible to reduce the number of clocks of the latency (clock cycle number).

However, after the HDL description is generated by the high level synthesis, it is difficult to change the description of the circuit in FIG. 5 to the description of the circuit in each of FIGS. 6 and 7 or change the description of the circuit in each of FIGS. 6 and 7 to the description of the circuit in FIG. 5 due to the low readability of the HDL description, as described above. In addition, after the integrated circuit is produced, it is almost impossible to make the above change between the circuits.

[High Level Synthesis in the Present Embodiment]

FIG. 8 is a diagram illustrating an example of a design apparatus 20 in the present embodiment. A design apparatus 20 is a computer dedicated to the high level synthesis obtained by installing high level synthesis programs ST1 and ST20 in a computer. The design apparatus 20 has a processor 21 such as a CPU, a memory 22, a storage (not illustrated) which stores the high level synthesis programs ST1 and ST20 and various pieces of data, and a bus BUS which connects the above elements. Further, although not illustrated, the design apparatus 20 has an input/output device such as a display or a keyboard, and a network interface which is connected to a network.

A high level synthesis program ST10 in the present embodiment has the high level synthesis program ST1 described in FIG. 2, and the program ST20 for expanding a new function by the present embodiment. The new function expansion program ST20 has a bypass stage extraction module ST21, a bypass setting circuit generation module ST22, and a bypass setting circuit connection module ST23. The functions of these modules will be described in detail later.

Data includes the high level synthesis library 14 which is referenced by the high level synthesis program ST20, the high level synthesis constraint 12, a behavior (behavioral) description 10 in the C language which is inputted by the high level synthesis program ST20, and the circuit description 16 in the HDL which is outputted by the high level synthesis program ST 20. In addition, the data includes high level synthesis report information 30 which is generated by the high level synthesis program ST20.

Further, the data includes bypass constraint information 31 which is referenced by the new function expansion program ST20, a bypass report 32 which is generated by the new function expansion program ST20, bypass stage information 33, and an HDL description 34 of a bypass setting circuit. Furthermore, the data includes a new circuit description 17 in which the HDL description 34 of the bypass setting circuit is combined with the circuit description 16 in the HDL. This combination process is the process in which the bypass setting circuit connection module ST23 of the new function expansion program ST20 generates the circuit description 17 in which a bypass control signal of the bypass setting circuit is connected to a bypass setting-capable register in the circuit description 16.

FIG. 9 is a flowchart of the high level synthesis program ST10 in the present embodiment. As described above, the high level synthesis program ST10 in the present embodiment has the common high level synthesis step ST1 and the new function expansion step ST20 which is additionally provided in the present embodiment.

The summary of the high level synthesis in the present embodiment is as follows.

First, the high level synthesis program ST10 sets the high level synthesis constraint, and generates the circuit description 16 in the HDL which implements the behavior of the source code 10. In the present embodiment, the high level synthesis constraint is set to the maximum clock frequency among the estimated behavioral states of the integrated circuit, and the high level synthesis is performed. As a result, as illustrated in, e.g., FIG. 5, the high level synthesis program ST10 generates the circuit description 16 in the HDL in which the registers FF are inserted at an interval corresponding to the period of the maximum clock frequency. In the example of the circuit in FIG. 5, the inter-stage registers FF are provided between four stages including the input stage and the three addition stages.

First, the newly added new function expansion program ST20 has the bypass stage extraction module (or step) ST21 which generates the bypass stage information 33 and the bypass report 32 based on the high level synthesis report information 30 and the bypass constraint information 31. In the bypass stage extraction step ST21, an extraction process for determining, among the inter-stage registers in the circuit description 16 in the HDL, which register FF on the output side of the stage is extracted as the bypass setting-capable register is performed based on a bypass constraint condition of the bypass constraint information 31. Further, it is preferable to extract all combination patterns of, among the extracted bypass setting-capable registers, registers for which bypass setting is performed based on the bypass constraint condition. As a result, the bypass stage information 33, which has combination patterns of the stages of the registers for which the bypass setting is performed which are selected from among a plurality of the stages of the bypass setting-capable registers, is generated. The bypass stage information 33 preferably has all of the combination patterns thereof.

Note that, as described in the glossary of definitions of terms described above, the bypass stage is the stage in which the inter-stage register or registers on the output side of the stage of the circuit is bypassed, and the bypass setting is performed on all of the inter-stage registers on the output side of the stage.

FIG. 10 is a diagram illustrating examples of the inter-stage register and the bypass setting-capable inter-stage register. The inter-stage register FF is a common D-type flip-flop, latches an input inputted to a data input terminal D at a timing of the rising edge (or falling edge) of a clock CLK, and outputs latched data from an output Q. The latched data is reset to 0 when a reset signal RST at an L level is inputted to a reset terminal RSTB.

On the other hand, a bypass setting-capable inter-stage register FF_bp is a D-type flip-flop FF having a bypass route BP connected to the input terminal D and a selector SEL which selects the bypass route BP or the flip-flop FF. When a bypass control signal S # satisfies S #=1, the selector SEL selects the bypass route BP and, when the bypass control signal S # satisfies S #=0, the selector SEL selects the flip-flop FF. With this, in the bypass setting-capable inter-stage register FF_bp, the bypass setting is performed by setting the bypass control signal S # to "1", and an input IN is bypassed without being regulated by the timing of the clock CK.

In addition, the bypass setting-capable inter-stage register FF_bp has a clock gate CG which supplies the clock CK to a clock terminal CLK in accordance with the inverted logic of the bypass control signal S #. When the bypass control signal S # satisfies S #=1, the clock gate CG inhibits passage of the clock signal CK and stops a latching operation of the flip-flop FF performed in synchronization with the clock.

Consequently, when the bypass setting of the inter-stage register is performed with S #=1, the clock gate CG inhibits the passage of the clock CK, the flip-flop stops the latching operation, and the flip-flop is brought into an electric power saving state. Conversely, when the bypass setting is canceled with S #=0, the clock gate permits the passage of the clock CK, and the flip-flop performs the latching operation.

FIG. 11 is a diagram illustrating an example of a circuit generated by the high level synthesis in the present embodiment. The circuit in FIG. 11 is the circuit in which the flip-flops FF serving as the inter-stage registers of the circuit in FIG. 5 are replaced with the bypass setting-capable inter-stage registers FF_bp. By setting the bypass control signals S1 to S4 to S1=0, S2=0, S3=1, and S4=0, the bypass setting is performed on, among the inter-stage registers in four stages, the inter-stage registers FF_bp in the third stage (S3=1). As a result, the inter-stage registers FF_bp in the third stage are deleted, the circuit becomes identical to the circuit in FIG. 6, and the latency from the input to the output is three clocks. In FIG. 11, the bypass control signals S1 to S4 are the same as the references of stages S1 to S4 in FIGS. 5-7.

In addition, as described in FIG. 10, in the bypass setting-capable inter-stage register FF_bp, when the bypass setting is performed, the clock gate CG inhibits the passage of the clock CK and stops the latching operation of the flip-flop. As a result, in the circuit in FIG. 11, the operation clock frequency is reduced to 100 MHz, and power consumption corresponding to two inter-stage registers is saved.

Similarly, in FIG. 11, by setting the bypass control signals S1 to S4 to S1=0, S2=1, S3=0, and S4=0, the bypass setting is performed on, among the inter-stage registers in four stages, the inter-stage registers FF_bp in the second stage (S2=1), power consumption corresponding to four inter-stage registers is saved, and the circuit becomes identical to the circuit in FIG. 7 substantially.

As will be described later, by providing the bypass setting circuit for generating the bypass control signals S1 to S4 with which the bypass setting or bypass non-setting of the bypass setting-capable inter-stage register FF_bp is determined, and making the combination of the bypass control signals outputted by the bypass setting circuit changeable using a mode signal which is set from the outside, it is possible to change the configuration of the circuit obtained by the high level synthesis. Similarly, even at the stage of the produced integrated circuit, it is possible to change the configuration of the circuit using the mode signal.

Returning to FIG. 9, first, the new function expansion program ST20 has the bypass stage extraction module (or step) ST21 which generates the bypass stage information 33 and the bypass report 32 based on the high level synthesis report information 30 and the bypass constraint information 31.

The high level synthesis report information 30 is the information generated by the high level synthesis program ST1 in the process of the high level synthesis, and has timing information such as the delay time of each stage, area information having the size of an area in which the circuit is formed such as the circuit scale, and information on the number of the bypass setting-capable registers in each stage. The bypass constraint information 31 has information indicating which inter-stage register in the stage is selected as the bypass setting-capable register and information indicating which inter-stage register is selected as the register for which the bypass setting is inhibited.

Consequently, in the bypass stage extraction step ST21, from among the inter-stage registers FF of the circuit illustrated in FIG. 5 which is generated by the high level synthesis step ST1, the register which is replaced with the bypass setting-capable inter-stage register FF_bp is extracted based on the bypass constraint information 31. In addition, all of the combination patterns of, among a plurality of the stages having the bypass setting-capable inter-stage registers FF_bp, the stages of the inter-stage registers for which the bypass setting is performed are extracted. A specific example thereof will be described later.

Further, in the bypass stage extraction step ST21, the delay time of the stage and the number of the inter-stage registers to be deleted are calculated for each of the combination pattern of the stages having the inter-stage registers for which the bypass setting is performed based on the high level synthesis report 30, and the bypass report 32 is thereby generated. The bypass report 32 has information indicating how the bypass control signal S # is to be set in the case where the clock frequency (i.e., timing) is prioritized, and information indicating how the bypass control signal S # is to be set in the case where the number of the inter-stage registers to be deleted (i.e., power consumption) is prioritized.

A user of the integrated circuit can set the state of the bypass setting-capable inter-stage register by referring to the bypass report and change the circuit to the circuit having a desired behavior. A specific example thereof will be described later.

Secondly, the new function expansion program ST20 has the bypass setting circuit generation module (or step) ST22 which generates the description 34 of the bypass setting circuit based on the bypass stage information 33. By setting the mode signal from the outside, the bypass setting circuit 34 performs the bypass setting of the combination of the stages of the inter-stage registers for which the bypass setting is performed which correspond to the set mode signal.

Thirdly, the new function expansion program ST20 has the bypass setting circuit connection module (or step) ST23 which generates the circuit 17 in a new HDL. In the bypass setting circuit connection step ST23, the inter-stage register in the circuit of the circuit description 16 in the HDL which is generated by the high level synthesis program ST1 is replaced with the bypass setting-capable inter-stage register, and the bypass setting-capable inter-stage registers are connected to the bypass setting circuit 34, thereby the circuit description 17 in the new HDL is generated. A specific example thereof will be described later.

Hereinbelow, the new function expansion program ST20 will be described in detail by using a specific example.

FIG. 12 is a diagram illustrating an example of the bypass constraint information. In FIG. 12, five bypass constraint conditions in five items are illustrated as the example. Item 1 is a bypass stage number (or a range of the number). For example, when the bypass stage number is set to 1-2, the number of the stages of the registers for which the bypass setting is performed simultaneously is limited to one stage or two stages. Herein, the bypass stage means, among four stages (the input stage and the three addition stages) in the circuit in FIG. 11 as an example, the stage in which the bypass setting of the register on the output side of the stage is performed. Consequently, when the bypass stage number is set to 1-2, among the bypass setting-capable registers on the output sides of the four stages in FIG. 11, the bypass setting to the registers in one stage or two stages is performed simultaneously. As the set value, it is possible to use the minimum number, the maximum number, a fixed number, and a range of the number.

Item 2 is bypass inhibition of the input first stage, and the set value is true or false. When the set value is set to true, bypass of the register in the input first stage is inhibited. By setting to true, each register in the input first stage S1 in FIG. 11 is not replaced with the bypass setting-capable register FF_bp, and remains as the normal register FF. In the case of a common circuit, the latching function of the register FF connected to the input terminal is sometimes indispensable and, in the case of such a circuit, the set value is set to true.

Item 3 is the bypass inhibition of the output final stage, and the set value is true or false. When the set value is set to true, the bypass of the register in the output final stage is inhibited. By setting to true, the register in the final stage S4 in FIG. 11 is not replaced with the bypass setting-capable register FF_bp, and remains as the normal register FF. In the case of a common circuit, the latching function of the register FF connected to the output terminal is sometimes indispensable and, in the case of such a circuit, the set value is set to true.

Item 4 is a specific stage in which the bypass is inhibited, and the set value is a stage number. When the set value is set to Stage_5N (N is an integer), the bypass of the registers in stages having multiples of 5 as the stage numbers is inhibited. Consequently, the registers FF in the stages having multiples of 5 as the stage numbers are not replaced with the bypass setting-capable registers FF_bp.

Item 5 is consecutive stages in which the bypass is inhibited. The set value "0" is false, and the bypass setting of consecutive stages is not inhibited (any number of consecutive stages may be bypassed). The set value "2" means that the minimum number of consecutive stages in which the bypass is inhibited is two. The bypass setting of two or more consecutive stages, i.e., all of the consecutive stages is inhibited. The set value "3" means that the minimum number thereof is three. In case of the set value "3", the bypass setting of two consecutive stages is permitted, but the bypass setting of three or more consecutive stages is inhibited.

In the example of the bypass constraint information in FIG. 12, in the bypass stage extraction step ST21 described later, the register FF in the stage other than the stages for which the bypass setting is inhibited by Items 2, 3, and 4 is determined to be the bypass setting-capable register FF_bp. Subsequently, all of the combination patterns of the stages in which the bypass setting of the bypass setting-capable register FF_bp is performed are extracted based on the constraint conditions in Items 1 and 5.

FIG. 13 is a diagram illustrating the summary of the bypass stage extraction step. FIG. 13 illustrates a circuit in which the bypass setting-capable registers FF_bp in four stages S1 to S4 are provided between an input terminal SI and an output terminal SO similar to those in FIG. 11. As illustrated in the drawing, the high level synthesis report information 30 has the number of the registers FF_bp in each of the stages S1 to S4, and the delay times between the registers (the delay time of each circuit stage). The number thereof and the delay times are as illustrated in the drawing.

Herein, a description will be given of the case where the bypass constraint information 31 has the bypass stage number "1" in Item 1. When the bypass setting of the bypass setting-capable registers FF_bp in the stage S2 is performed and the stage S2 is set as the bypass stage, four registers in the stage S2 are bypassed, the four registers are deleted, and power consumption corresponding to the four registers is saved. In addition, a data path is from S1 to S3, and the delay time thereof is 2.65 ns+2.51 ns=5.16 ns.

Similarly, when the bypass setting of the bypass setting-capable registers FF_bp in the stage S3 is performed and the stage S3 is set as the bypass stage, two registers in the stage S3 are bypassed, the two registers are deleted, and power consumption corresponding thereto is saved. Further, the data path is from S2 to S4, and the delay time thereof is 2.51 ns+2.23 ns=4.74 ns.

The delay time in the case where the bypass setting of the register in the stage S1 or S4 is as illustrated in the drawing.

As illustrated in FIG. 13, in the bypass stage extraction step, the stage of the register for which the bypass setting is performed (bypass stage) is extracted based on the bypass constraint information, and bypass stage selection patterns and the bypass stage information in which the bypass stage selection patterns are gathered are generated. In addition, in the bypass stage extraction step, the change of the delay time caused by the bypass setting and the number of the registers to be deleted are calculated for each bypass stage selection pattern, and the bypass report is generated.

[Bypass Stage Extraction Step ST21]

FIG. 14 is a flowchart of the bypass stage extraction step ST21. FIG. 15 is a diagram illustrating an example of a detailed version of the bypass report. The bypass stage extraction step will be described with reference to the detailed version of the bypass report. Note that the detailed version of the bypass report includes the bypass stage selection pattern.

In the bypass stage extraction step ST21, the bypass constraint information is read (ST31), the high level synthesis report information is read (ST32), and the bypass report is generated (ST33). Subsequently, the detailed version and summarized version of the bypass report are generated by compiling the results generated in the bypass report generation step ST33 (ST34), and the bypass stage information is generated by gathering the bypass stage selection patterns generated in the bypass report generation step ST33 (ST35).

Next, the above bypass report generation step ST33 will be described. Herein, with regard to the bypass constraint, it is assumed that there is no stage in which the bypass is inhibited (each of the set values 2 and 3 is false, and the set value 4 is not present), the minimum number of consecutive stages in which the bypass is inhibited, which is the set value 5, is "3" (the number of consecutive bypass stages up to 2 is permitted), and the bypass stage number, which is the set value 1, is 1-2 (1 to 2). As a result, as in the circuit illustrated in FIG. 11, the bypass setting-capable inter-stage registers FF_bp are inserted in all of the stages S1 to S4.

The bypass report generation step ST33 is repeatedly performed for each bypass stage number and, when all of the bypass stage numbers are processed, the bypass report generation step ST33 is ended (ST40). In the above bypass constraint, the bypass stage number is 1-2, and hence the bypass stage numbers are 1 and 2.

First, in the bypass report generation step, the bypass stage number is selected (ST41). For example, the bypass stage number 1 is selected from the bypass stage numbers 1 and 2 set by the bypass constraint. Subsequently, in the bypass report generation step, four patterns in which the bypass setting is performed on the four stages S1 to S4 in FIG. 11 individually are generated as the bypass stage selection patterns (ST42). That is, the bypass stage selection patterns of "a report R1_1 of delay information in the case where the number of bypass stages is one" in FIG. 15 are generated. The same applied to a report R2_1. This bypass stage selection pattern has four patterns in which the bypass setting is performed on the stages S1 to S4 individually (indicated by "bypass" in the drawing).

Similarly, in the case where the bypass stage number 2 is selected, the bypass stage selection patterns of "a report R1_2 of delay information in the case where the number of bypass stages is two" in FIG. 15 are generated. The same applies to a report R2_2. That is, this bypass stage pattern has six patterns in which the bypass setting is performed on, among the four stages S1 to S4, two stages (indicated by "bypass" in the drawing) simultaneously (not necessarily consecutive 2).

As described above, the bypass stage selection pattern is the combination pattern of the stages which are selected for the bypass setting (for which the bypass setting is performed) from among a plurality of the bypass setting-capable stages.

Next, in the bypass report generation step, the steps ST44 to ST47 are repeatedly performed for each of a plurality of the generated bypass stage selection patterns (ST43). First, the bypass stage selection pattern is selected (ST44). For example, it is assumed that the top bypass stage selection pattern (the pattern of a mode setting M1S1) of each of the reports R1_1 and R2_1 in FIG. 15 is selected. The top bypass stage selection pattern is the pattern in which the bypass setting of the register on the output side in the first stage S1 is performed, and the bypass setting of the remaining stages S2, S3, and S4 is not performed. In the bypass report generation step, the name (ID) of the mode setting is assigned to the selected bypass stage selection pattern (ST45). In an example in each of the reports R1_1 and R2_2, the ID of the mode setting of the top pattern is "M1S1".

Subsequently, in consideration of the stage for which the bypass setting is performed, the delay time of each path (the delay time between the registers) is calculated, and the maximum path delay time is calculated from the delay time of each path (ST46). In an example of the report R1_1, the bypass setting is performed on the stage S1 in the top pattern M1S1. With this, the delay time is increased to 6.65 ns which is longer than the other path delay times, and the maximum path delay time is 6.65 ns.

In addition, the number of registers in each stage is calculated (ST47). In this calculation, the numbers of registers FF in the individual stages are added up, and the total number of registers and the number of registers which are deleted by the bypass setting are calculated. In an example of the report R2_1, in the top pattern M1S1, the number of registers FF in the stage S1 is 0, the total number of registers FF is 7, and the number of deleted registers FF is 8.

When the above steps ST44 to ST47 are completed for all of the four bypass stage selection patterns in each of the reports R1_1 and R2_1 (YES in ST43), the four patterns are ranked according to the maximum path delay (ST48), and are ranked according to the number of registers FF or the number of deleted registers FF (ST49). According to the ranking, mode setting rankings are added to the report. As a result, the reports R1_1 and R2_1 in FIG. 15 are generated.

That is, the shorter the maximum delay time of the pattern is, the higher a rank based on timing priority (frequency priority) is. For example, in the report R1_1, a mode setting M1S3 has a ranking TM1L1 which corresponds to the highest rank. In the report R1_2, a mode setting M2S24 has a ranking TM2L1 which corresponds to the highest rank.

In addition, the larger the number of deleted registers FF of the pattern is, the higher a rank based on power consumption priority is. For example, in the report R2_1, the mode setting M1S1 has a ranking PM1L1 which corresponds to the highest rank. In the report R2_2, a mode setting M2S12 has a ranking PM2L1 which corresponds to the highest rank.

For the reports R1_2 and R2_2 as well, the calculation of the path delay time (ST46), the calculation of the number of registers and the number of registers which are deleted by the bypass setting (ST47), and the ranking (each of ST48 and ST49) are performed, and the reports illustrated in FIG. 15 are generated.

In the bypass stage extraction step ST21, the detailed version and the summarized version of the bypass report are generated based on the calculation results of the above bypass report generation step ST33 (ST34). As illustrated in FIG. 15 as the example, the detailed version of the bypass report has, e.g., the delay information reports R1_1 and R1_2 (the bypass stage number 1, 2), and the register FF number information reports R2_1 and R2_2 (the bypass stage number 1, 2) on a per bypass stage number basis. In the case where other priority conditions other than the delay information and the register number information which serve as indexes of change of the circuit by the user are present, it is preferable to generate the report for each of the priority conditions. As the other priority conditions, for example, evenness of the delay time, and order of a balance between the maximum delay time and the number of deleted registers (descending order of the total evaluation of both indexes) are conceivable.

FIG. 16 is a diagram illustrating an example of the summarized version of the bypass report. In FIG. 16, in a report SR1, a ranking ID of the highest rank and its mode setting ID based on the timing priority (delay time priority) and the ranking ID of the highest rank and its mode setting ID based on the power consumption priority (deleted FF number priority) are summarized on a per bypass stage number basis. The report SR1 corresponds to the case where the bypass inhibition of the input first stage S1 is false, and hence the highest ranks are the same as those in the detailed version of the bypass report in FIG. 15.

Similarly to the report SR1, a report SR2 indicates the ranking ID of the highest rank and its mode setting ID based on each of the timing priority and the power consumption priority on a per bypass stage number. However, the report SR2 corresponds to the case where the bypass inhibition of the input first stage S1 is true, and hence the report SR2 indicates the highest ranks in the case where the bypass register selection pattern in which the first stage S1 is bypassed is excluded from the detailed version of the bypass report.

In a report SR3, the maximum delay time for each ranking ID and its mode setting ID based on the timing priority in the report SR2 is additionally provided. In a report SR4, the number of deleted registers FF for each ranking ID and its mode setting ID based on the power consumption priority in the report SR2 is additionally provided.

The summarized version of the bypass report is the report referenced by the user when the user changes the circuit configuration after the high level synthesis, particularly after the production, and is preferably the report obtained by editing the detailed version of the bypass report in accordance with the above purpose. The summarized version of the bypass report illustrated in FIG. 16 is only exemplary, and the report edited in a manner other than the above manner may also be used. Examples of such a report include a table of the mode setting ID and the maximum delay time (or frequency) sorted according to the rank based on the timing priority which is generated on a per bypass stage number basis, a table of the mode setting ID and the number of deleted registers FF sorted according to the rank based on the power consumption priority which is generated on a per bypass stage number basis, a table of the mode setting ID and the maximum delay time (or frequency) simply sorted according to the rank based on the timing priority irrespective of the bypass stage number, and a table of the mode setting ID and the number of deleted registers simply sorted according to the rank based on the power consumption priority irrespective of the bypass stage number.

Next, the above bypass stage information generation step ST35 will be described. In the bypass stage information generation step, all of the bypass stage selection patterns generated in the bypass report generation step ST33 and the mode setting IDs assigned thereto are gathered. That is, the bypass stage information is the set of the bypass stage selection patterns and the mode setting IDs of the reports R1_1 and R1_2 or R2_1 and R2_2 in FIG. 15. As a result, the bypass stage information 33 illustrated in FIG. 18 is generated.

[Bypass Setting Circuit Generation Step ST22]

FIG. 17 is a flowchart of the bypass setting circuit generation step ST22. As illustrated in FIG. 9, in the bypass setting circuit generation step, the description of the bypass setting circuit is generated from the bypass stage information 33 generated in the bypass stage extraction step ST21.

FIG. 18 is a diagram illustrating examples of the bypass stage information, a decode table, and the bypass setting circuit. The flowchart in FIG. 17 will be described with reference to FIG. 18. As illustrated in FIG. 17, in the bypass setting circuit generation step, the bypass stage information 33 is read first (ST50). The bypass stage information is a table indicating, among the registers of the individual stages, which register of the stage (the register on the output side of the stage) the bypass setting is performed on in accordance with the mode setting ID. The bypass stage selection pattern is represented based on the binary system, and a decode table 33D representing the relationship among the mode setting ID, a mode code MODE, and the bypass stage selection pattern is generated (ST51). Lastly, when the mode code MODE is set according to the decode table 33D, the description of the bypass setting circuit 34 which generates the bypass control signals S1 to S4 indicated in the bypass stage selection pattern is generated (ST52).

[Bypass Setting Circuit Connection Step ST23]

FIG. 19 is a flowchart of the bypass setting circuit connection step ST23. FIG. 20 is a diagram illustrating a new circuit after the bypass setting circuit is connected.

In the bypass setting circuit connection step, the description 34 of the bypass setting circuit and the circuit description 16 in the HDL are read (ST60, ST61), and among the inter-stage registers FF in the individual stages in the circuit description 16 in the HDL, the inter-stage register FF in the bypass setting-capable stage in the bypass stage information 33 is replaced with the bypass setting-capable register FF_bp (ST62).

In addition, in the connection step, the circuit description is changed such that the bypass control signals S1 to S4 of the bypass setting circuit are connected to the bypass setting terminals of the bypass setting-capable registers FF_bp in the individual stages (ST63). As a result, the circuit description 17 in the new HDL in which the bypass setting circuit 34 is connected to the circuit of the circuit description 16 in the HDL as disclosed in FIG. 20 is generated (ST64).

Note that a mode register MODE_REG in FIG. 18 is incorporated in the bypass setting circuit 34 illustrated in FIG. 20.

Second Embodiment

In the first embodiment, all of the inter-stage registers FF in the circuit in the HDL generated in the high level synthesis step ST1 are replaced with the bypass setting-capable registers FF_bp. In a second embodiment, in the case where the bypass constraint information includes the constraint of the stage in which the bypass is inhibited (Items 2, 3, and 4), only the inter-stage register FF for which the bypass setting is permitted is replaced with the bypass setting-capable register FF_bp. With this, it is possible to reduce the size of the bypass setting circuit.

Each of FIGS. 21 and 22 is a diagram illustrating the summary of the second embodiment. Similarly to FIG. 11, an example in FIG. 21 is an example in which all of the inter-stage registers are replaced with the bypass setting-capable registers FF_bp. In contrast, FIG. 22 illustrates a circuit configuration in the case where the bypass constraint information includes the constraint which inhibits the bypass setting of the registers in the first stage and the final stage. In an example in FIG. 22, the bypass setting of the register belonging to the first stage S1 and the register belonging to the final stage S4 is inhibited, and hence the registers remain as the normal registers FF. The registers in the stages S2 and S3 other than the above registers are replaced with the bypass setting-capable registers FF_bp.

In the case of the circuit in FIG. 22, the bypass control signals need to be supplied only to the stages S2 and S3 for which the bypass setting may be performed, and hence it is possible to reduce the scale of the bypass setting circuit and the number of the bypass control signals, and reduce the circuit area and power consumption.

FIG. 23 is a flowchart of the high level synthesis program in the second embodiment. A process different from processes in FIG. 9 in the first embodiment is a process for replacing only the register corresponding to the bypass setting-capable stage included in the bypass stage selection pattern in the bypass stage information with the bypass setting-capable register FF_bp by referring to the bypass stage information 33 in the bypass setting circuit connection step ST23. The referring line is added between the blocks 33 and ST23 in FIG. 23. The other processes are the same as those in FIG. 9.

FIG. 24 is a flowchart of the bypass setting circuit connection step ST23 in the second embodiment. A process different from processes in FIG. 14 in the first embodiment is a process step ST42_1 of deleting a bypass inhibition stage from the bypass stage selection pattern, and the other processes are the same as those in FIG. 14. That is, in the step ST42, the bypass stage selection pattern is generated on the assumption that all of the inter-stage registers are bypass candidates and are replaced with the bypass setting-capable registers irrespective of the bypass inhibition stage of the bypass constraint. However, in the second embodiment, in the step ST42_1, the bypass inhibition stage specified by the bypass constraint is deleted from the bypass candidate and, similarly, the bypass inhibition stage is deleted from the bypass stage selection pattern. For example, when the bypass constraint specifies the first stage S1 and the final stage S4 as the bypass inhibition stages, from the bypass stage selection patterns in the detailed version of the bypass report in FIG. 15, the pattern in which the bypass setting of the stage S1 or S4 is performed is deleted.

FIG. 25 is a diagram illustrating an example of the detailed version of the bypass report in the second embodiment. In the second embodiment, the pattern which includes the bypass inhibition stages S1, S4 is deleted from the bypass stage selection patterns in the detailed version of the bypass report in FIG. 15. As a result, hatched bypass stage selection patterns are deleted from the bypass report in FIG. 25, and the number of patterns is reduced to 2 in the case where the number of bypass stages is 1, the number of patterns is reduced to 1 in the case where the number of bypass stages is 2, and the total number thereof is reduced to three.

FIG. 26 is a diagram illustrating the bypass stage information, the decode table, and the bypass setting circuit. When compared with FIG. 18, in the bypass stage information 33 in FIG. 26, the number of stages in the bypass stage selection pattern is reduced to two and the stages are the stages S2 and S3, and the number of mode setting IDs is reduced and the mode setting IDs are a circuit mode MO in which the bypass setting is not performed on any of the registers, and three mode setting IDs M1S2, M1S3, and M2S23. Correspondingly, the size of the decode table 33D is reduced and, therefore, the input bit of the bypass setting circuit 34 is two bits, the number of outputted bypass control signals is reduced to two and the bypass control signals are the bypass control signals S2 and S3, and, as a result, the scale of the bypass setting circuit is reduced and electric power is saved.

FIG. 27 is a flowchart of the bypass setting circuit connection step ST23 in the second embodiment. The process ST62 for replacing the register in each stage of the circuit of the circuit description in the HDL with the bypass setting-capable register FF_bp in FIG. 19 is changed to a process ST62_1 for replacing the register FF in the stage described in the bypass stage selection pattern in the bypass stage information 33 with the bypass setting-capable register FF_bp in FIG. 27. That is, the bypass stage selection pattern in the bypass stage information 33 does not include the stage in which the bypass is inhibited by the bypass constraint, and hence, in the step ST62_1, the register FF in the stage in which the bypass is inhibited by the bypass constraint is not replaced with the bypass setting-capable register FF_bp.

FIG. 28 is a diagram illustrating a circuit in a new HDL in which the bypass setting circuit in the second embodiment is connected. As described above, the bypass setting circuit 34 outputs only two bypass control signals S2 and S3, and the two bypass control signals are connected to the bypass setting-capable registers FF_bp in the circuit 17 in the HDL.

Third Embodiment

In each of the first and second embodiments, the circuit description in one HDL is generated from one source code SRC. In contrast to this, in a third embodiment, the circuit description is generated from each of a plurality of pieces of source code, and the integrated circuit having the circuits of the circuit descriptions is generated.

FIG. 29 is a diagram illustrating the configuration of the integrated circuit of the HDL description in the third embodiment. An integrated circuit LSI in FIG. 29 has circuits 17_1 to 17_6 of HDL descriptions in which bypass setting circuits 34_1 to 34_6 of the HDL descriptions are connected to six circuits 16_1 to 16_6 of the HDL descriptions. The individual bypass setting circuits supply bypass control signals S # to the circuits 16_1 to 16_6 in accordance with the set values of the mode registers MODE_REG, and the bypass setting is performed on the registers in the stages of predetermined combinations.

Thus, according to the design method which includes the high level synthesis in the present embodiment, from the HDL description of the circuit in which the inter-stage register in the circuit is replaced with the bypass setting-capable register and a plurality of the bypass stage selection patterns conforming to the bypass constraint, bypass report information having the rank of the bypass stage selection pattern corresponding to the priority conditions such as the timing priority (the priority based on the delay time in the stage) and the power consumption priority (the priority based on the number of registers deleted by the bypass setting) is generated. Consequently, the user can easily change the operation mode of the circuit in the integrated circuit generated based on the HDL description to a desired operation mode based on the bypass report information.

What is claimed is:

1. A design method including a high level synthesis process, the design method comprising:
   generating a hardware description of a circuit and high level synthesis report information from a source code in which a behavior of the circuit is described in a software language based on a high level synthesis constraint, the hardware description describing a circuit including a plurality of stages each stage having a stage circuit and an inter-stage register provided between each two stages of the plurality of stages;
   determining a bypass stage selection pattern based on bypass constraint information including a constraint condition related to a bypass of the inter-stage register and the high level synthesis report information, the bypass stage selection pattern including a plurality of patterns each pattern having a combination of stages of inter-stage registers for which a bypass setting is performed among stages of bypass setting-capable inter-stage registers; and
   generating bypass report information based on the bypass stage selection pattern, the bypass report information including combination information of the inter-stage registers for which the bypass setting is performed corresponding to a priority condition.

2. The design method according to claim 1, wherein
   in the generating the hardware description, the high level synthesis constraint includes a constraint in which the circuit is able to operate at a requested fastest clock frequency, and a delay time of the plurality of stages of the circuit conforming to the hardware description is not more than a period of the requested fastest clock frequency.

3. The design method according to claim 2, wherein
   the bypass constraint information includes the constraint condition
   having any of or any combination of a number of stages of the bypass setting-capable inter-stage registers, a stage of a specific bypass setting-capable inter-stage register, a stage of a specific inter-stage register for which the bypass setting is inhibited, and a minimum value of a number of consecutive stages of inter-stage registers for which the bypass setting is inhibited, and
   the bypass stage selection pattern includes a plurality of the combinations of the stages of the inter-stage registers for which the bypass setting is performed in which the constraint condition in the bypass constraint information being satisfied.

4. The design method according to claim 3, wherein
   the high level synthesis report information includes a delay time of each stage of the plurality of stages and a number of the inter-stage registers of said each stage,
   the priority condition includes one of: a first priority condition in which a shorter maximum stage delay time in each combination of the plurality of the combinations is prioritized, and a second priority condition in which a greater total number of the inter-stage registers for which the bypass setting is performed in each combination of the plurality of the combinations is prioritized, and
   the bypass report information includes a ranking in an ascending order or a descending order of the shorter maximum stage delay time in a case of the first priority condition, and includes a ranking in a descending order or an ascending order of a total number of the inter-stage registers for which the bypass setting is performed in a case of the second priority condition.

5. The design method according to claim 1, wherein
   each one of the bypass setting-capable inter-stage registers includes a latch circuit which retains an output signal of each said stage, a bypass wiring which bypasses the latch circuit, a selector which selects the latch circuit or the bypass wiring based on a bypass control signal, and a clock gate which allows or does not allow passage of a clock based on the bypass control signal, and
   the bypass setting of the bypass setting-capable inter-stage register is performed according to the bypass control signal.

6. The design method according to claim 5, further comprising:
   generating, in accordance with a mode setting value corresponding to each pattern in the bypass stage selection pattern, the bypass control signal for the bypass setting or a bypass non-setting corresponding to the combination of the stages of the inter-stage registers for which the bypass setting is performed in each pattern; and
   adding to the hardware description a description of a bypass setting circuit configured to supply the bypass control signal to the bypass setting-capable inter-stage register.

7. The design method according to claim 5, wherein
   in the determining the bypass stage selection pattern, the bypass setting-capable inter-stage register is selected by excluding the inter-stage register in a specific stage which is specified by the constraint condition and in which the bypass setting is inhibited, from the inter-stage register included in the circuit conforming to the hardware description.

8. A non-transitory computer-readable storage medium that stores therein a program causing a computer to execute a design program including a high level synthesis process comprising:
   generating a hardware description of a circuit and high level synthesis report information from a source code in which a behavior of the circuit is described in a software language based on a high level synthesis constraint, the hardware description describing a circuit including a plurality of stages each stage having a stage circuit and an inter-stage register provided between each two stages of the plurality of stages;
   determining a bypass stage selection pattern based on bypass constraint information including a constraint condition related to a bypass of the inter-stage register and the high level synthesis report information, the bypass stage selection pattern including a plurality of patterns each pattern having a combination of stages of inter-stage registers for which a bypass setting is performed among stages of bypass setting-capable inter-stage registers; and
   generating bypass report information based on the bypass stage selection pattern, the bypass report information including combination information of the inter-stage registers for which the bypass setting is performed corresponding to a priority condition.

9. The non-transitory computer-readable storage medium according to claim 8, wherein
   in the generating the hardware description, the high level synthesis constraint includes a constraint in which the circuit is able to operate at a requested fastest clock frequency, and a delay time of the plurality of stages of the circuit conforming to the hardware description is not more than a period of the requested fastest clock frequency.

10. The non-transitory computer-readable storage medium according to claim 9, wherein,
the bypass constraint information includes the constraint condition having any of or any combination of a number of stages of the bypass setting-capable inter-stage registers, a stage of a specific bypass setting-capable inter-stage register, a stage of a specific inter-stage register for which the bypass, setting is inhibited, and a minimum value of a number of consecutive stages of inter-stage registers for which the bypass setting is inhibited, and
the bypass stage selection pattern includes a plurality of the combinations of the stages of the inter-stage registers for which the bypass setting is performed in which the constraint condition in the bypass constraint information being satisfied.

11. A design apparatus comprising:
a processor; and
a memory being accessible by the processor; wherein
the processor executes a design program including a high level synthesis process comprising:
generating a hardware description of a circuit and high level synthesis report, information from a source code in which a behavior of the circuit is described in a software language based on a high level synthesis constraint, the hardware description describing a circuit including a plurality of stages each stage having a stage circuit and an inter-stage register provided between each two stages of the plurality of stages;
determining a bypass stage selection pattern based on bypass constraint information including a constraint condition related to a bypass of the inter-stage register and the high level synthesis report information, the bypass stage selection pattern including a plurality of patterns each pattern having a combination of stages of inter-stage registers for which a bypass setting is performed among stages of bypass setting-capable inter-stage registers; and
generating bypass report information based on the bypass stage selection pattern, the bypass report information including combination information of the inter-stage registers for which the bypass setting is performed corresponding to a predetermined priority condition.

12. The design apparatus according to claim 11, wherein
in the generating the hardware description, the high level synthesis constraint includes a constraint in which the circuit is able to operate, at a requested fastest clock frequency, and a delay time of the plurality of stages of the circuit conforming to the hardware description is not more than a period of the requested fastest clock frequency.

13. The design apparatus according to claim 12, wherein
the bypass constraint information includes the constrain condition having any of or any combination of a number of stages of the bypass setting-cable inter-stage registers, a stage of a specific bypass setting-capable inter-stage register, a stage of a specific inter-stage register for which the bypass setting is inhibited, and a minimum value of a number of consecutive stages of inter-stage registers for which the bypass setting is inhibited, and
the bypass stage selection pattern includes a plurality of the combinations of the stages of the inter-stage registers for which the bypass setting is performed in which the constraint condition in the bypass constraint information being satisfied.

* * * * *

UNITED STATES PATENT AND TRADEMARK OFFICE
CERTIFICATE OF CORRECTION

PATENT NO. : 10,606,972 B2
APPLICATION NO. : 15/968327
DATED : March 31, 2020
INVENTOR(S) : Atsushi Yasunaka It is certified that error appears in the above-identified patent and that said Letters Patent is hereby corrected as shown below:

On the Title Page

Item (54) and in the Specification, Column 1, Lines 1 - 3 please correct the title to read as follows:
-- DESIGN METHOD, DESIGN PROGRAM, AND DESIGN APPARATUS OF A HIGH LEVEL SYNTHESIS PROCESS OF A CIRCUIT --.

Signed and Sealed this
Twenty-sixth Day of May, 2020

Andrei Iancu
*Director of the United States Patent and Trademark Office*